United States Patent
Shao et al.

(10) Patent No.: US 10,735,159 B2
(45) Date of Patent: Aug. 4, 2020

(54) UPLINK REFERENCE SIGNAL TRANSMISSION METHOD, USER TERMINAL, AND BASE STATION

(71) Applicant: HUAWEI TECHNOLOGIES CO., LTD., Shenzhen, Guangdong (CN)

(72) Inventors: Jiafeng Shao, Beijing (CN); Sha Ma, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 144 days.

(21) Appl. No.: 15/894,070

(22) Filed: Feb. 12, 2018

(65) Prior Publication Data

US 2018/0167186 A1 Jun. 14, 2018

Related U.S. Application Data

(63) Continuation of application No. PCT/CN2015/086842, filed on Aug. 13, 2015.

(51) Int. Cl.
*H04L 5/00* (2006.01)
*H04W 72/04* (2009.01)
*H04L 5/14* (2006.01)

(52) U.S. Cl.
CPC .......... *H04L 5/0048* (2013.01); *H04L 5/0051* (2013.01); *H04W 72/04* (2013.01); *H04L 5/0094* (2013.01); *H04L 5/1469* (2013.01)

(58) Field of Classification Search
CPC ............ H04J 11/0069; H04L 27/2613; H04W 72/1284
See application file for complete search history.

(56) References Cited

U.S. PATENT DOCUMENTS 9,565,676 B1 * 2/2017 Kothari ................. H04L 5/0098
2009/0046645 A1   2/2009 Bertrand et al.
(Continued)

FOREIGN PATENT DOCUMENTS

CN    101795145 A   8/2010
CN    102223726 A   10/2011
(Continued)

OTHER PUBLICATIONS

International Search Report dated May 19, 2016, in corresponding International Patent Application No. PCT/CN2015/06842, 4 pgs.
(Continued)

*Primary Examiner* — Asad M Nawaz
*Assistant Examiner* — Berhanu D Belete
(74) *Attorney, Agent, or Firm* — Slater Matsil, LLP

(57) ABSTRACT

Embodiments of the present invention provide an uplink reference signal transmission method, a user terminal, and a base station. The uplink reference signal transmission method according to the present invention includes: determining an uplink reference signal position including at least one uplink reference signal symbol group, where each group includes at least one time unit; determining an uplink reference signal symbol group corresponding to a user terminal; and sending an uplink reference signal in a time unit of the uplink reference signal symbol group corresponding to the user terminal. The embodiments of the present invention can ensure an uplink capacity of a system.

18 Claims, 13 Drawing Sheets

A base station sends first higher layer signaling to a user terminal, where the first higher layer signaling is used by the user terminal to determine an uplink reference signal position, the uplink reference signal position includes at least one uplink reference signal symbol group, and each uplink reference signal symbol group includes at least one time unit — S1501

The base station sends second higher layer signaling to the user terminal, or sends first control information to the user terminal by using a physical channel, where the second higher layer signaling or the first control information includes indication information of an uplink reference signal symbol group corresponding to the user terminal, and the indication information of the uplink reference signal symbol group corresponding to the user terminal is used to instruct the user terminal to determine, in the uplink reference signal position, the uplink reference signal symbol group corresponding to the user terminal — S1502

The base station receives an uplink reference signal sent by the user terminal in a time unit of the uplink reference signal symbol group corresponding to the user terminal — S1503

(56) References Cited

U.S. PATENT DOCUMENTS

| | | | |
|---|---|---|---|
| 2010/0103867 A1* | 4/2010 | Kishiyama | H04W 52/04 370/320 |
| 2010/0118805 A1* | 5/2010 | Ishii | H04W 52/367 370/329 |
| 2011/0092240 A1* | 4/2011 | Aiba | H04L 1/0025 455/509 |
| 2012/0082058 A1* | 4/2012 | Gerstenberger | H04W 36/00837 370/252 |
| 2013/0114564 A1* | 5/2013 | Ogawa | H04L 5/0012 370/330 |
| 2013/0135984 A1* | 5/2013 | Choi | H04W 72/04 370/209 |
| 2013/0148593 A1* | 6/2013 | Suzuki | H04L 5/0051 370/329 |
| 2014/0171111 A1* | 6/2014 | Xiao | G01S 1/02 455/456.1 |
| 2014/0241284 A1 | 8/2014 | Zhou | |
| 2015/0009845 A1* | 1/2015 | Takano | H04W 52/0206 370/252 |
| 2015/0063272 A1* | 3/2015 | Suzuki | H04L 5/0051 370/329 |
| 2015/0181366 A1* | 6/2015 | Chae | H04W 56/004 370/336 |
| 2015/0222402 A1* | 8/2015 | Ouchi | H04L 1/00 370/329 |
| 2015/0249526 A1* | 9/2015 | Kim | H04L 5/0051 370/329 |
| 2015/0358133 A1* | 12/2015 | Kusashima | H04L 5/0048 370/280 |
| 2016/0205704 A1* | 7/2016 | Aiba | H04W 72/14 370/329 |
| 2016/0227373 A1* | 8/2016 | Tsai | H04W 4/025 |
| 2016/0255649 A1* | 9/2016 | Kusashima | H04L 1/1812 370/280 |
| 2016/0285602 A1* | 9/2016 | Fang | H04W 24/02 |
| 2016/0345199 A1* | 11/2016 | Nogami | H04L 5/003 |
| 2016/0381681 A1* | 12/2016 | Nogami | H04W 24/10 370/280 |
| 2017/0005770 A1* | 1/2017 | Shimezawa | H04L 1/0026 |
| 2017/0034808 A1* | 2/2017 | Ouchi | H04W 72/042 |
| 2017/0048834 A1* | 2/2017 | Suzuki | H04L 5/0051 |
| 2017/0118745 A1* | 4/2017 | Nogami | H04W 72/0406 |
| 2017/0188328 A1* | 6/2017 | Cui | H04W 52/325 |
| 2017/0245249 A1* | 8/2017 | Suzuki | H04L 1/1812 |
| 2017/0311321 A1* | 10/2017 | Kakishima | H04L 25/0226 |
| 2018/0092074 A1* | 3/2018 | Suzuki | H04W 72/1289 |
| 2018/0145808 A1* | 5/2018 | Kim | H04B 7/04 |

FOREIGN PATENT DOCUMENTS

| | | |
|---|---|---|
| CN | 103095442 A | 5/2013 |
| CN | 103096389 A | 5/2013 |
| EP | 2775759 A1 | 9/2014 |
| WO | 2011095009 A1 | 8/2011 |
| WO | 2011135788 A1 | 11/2011 |
| WO | 2012/044023 A1 | 4/2012 |
| WO | 2014208859 A1 | 12/2014 |

OTHER PUBLICATIONS

R1-106007, Mediatek Inc., "Details on Aperiodic SRS," 3GPP TSG RAN WG1 Meeting #63, Jacksonville, USA, Nov. 15-19, 2010 (3 pp.).

R1-105144, Huawei, HiSilicon, "Remaining issues for aperiodic sounding," 3GPP TSG RAN WG1 meeting #62 bis, Xi'an, China, Oct. 11-15, 2010 (6 pp.).

R1-080803, Mitsubishi Electric, "UL Sounding RS Control Signaling for Closed Loop Antenna Selection," 3GPP RAN1#52, Sorrento, Italy, Feb. 11-15, 2008, pp. 1-7.

R1-081364, Texas Instruments, "Sounding Reference Signal in Support of Scheduling Request in E-UTRA," 3GPP TSG RAN WG1 #52bis, Shenzhen, China, Mar. 31-Apr. 4, 2008, pp. 1-7.

R1-102040, Panasonic, "SRS enhancement for LTE-Advanced," 3GPP TSG RAN WG1 Meeting #60bis, Beijing, China, Apr. 12-16, 2010, pp. 1-3.

Notice of Reasons for Rejection, dated Nov. 5, 2018, in Japanese Application No. 2018-507523 (8 pp.).

Intel Corporation, "On DM-RS enhancements for FD-MIMO", 3GPP TSG RAN WG1 Meeting #80, R1-1502393, Athens, Greece, Feb. 17-21, 2015, XP050933452, pp. 1-3.

Extended European Search Report, dated Jul. 13, 2018, in European Application No. 15900780.6 (7 pp.).

International Search Report dated May 19, 2016 in corresponding International Patent Application No. PCT/CN2015/086842.

* cited by examiner

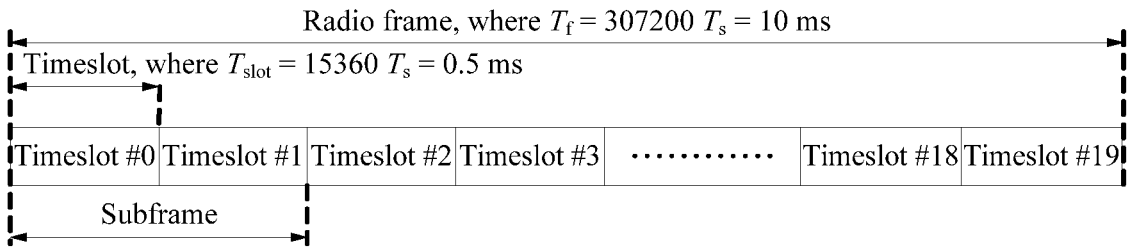

FIG. 2

```
┌─────────────────────────────────────────────────────────────┐
│ A user terminal determines an uplink reference signal position │
│ according to first higher layer signaling, where the uplink    │ ~ S301
│ reference signal position includes at least one uplink         │
│ reference signal symbol group, and each uplink reference       │
│ signal symbol group includes at least one time unit            │
└─────────────────────────────────────────────────────────────┘
                              │
┌─────────────────────────────────────────────────────────────┐
│ The user terminal determines, in the uplink reference signal   │
│ position according to second higher layer signaling or         │
│ received first control information of a physical channel, an  │ ~ S302
│ uplink reference signal symbol group corresponding to the     │
│ user terminal, where the second higher layer signaling or the │
│ first control information includes indication information of  │
│ the uplink reference signal symbol group corresponding to the │
│ user terminal                                                  │
└─────────────────────────────────────────────────────────────┘
                              │
┌─────────────────────────────────────────────────────────────┐
│ The user terminal sends an uplink reference signal in a time   │ ~ S303
│ unit of the uplink reference signal symbol group corresponding │
│ to the user terminal                                           │
└─────────────────────────────────────────────────────────────┘
```

FIG. 3

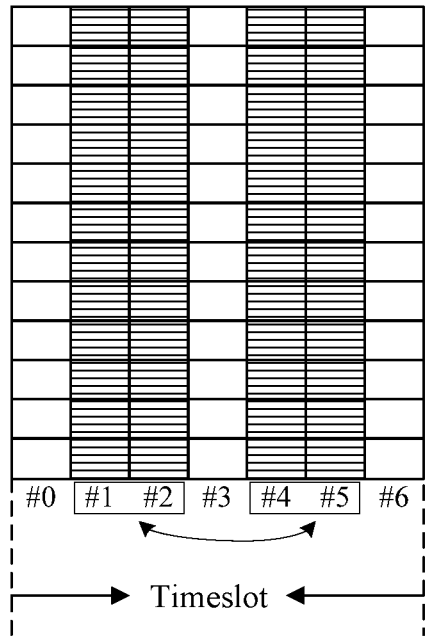

FIG. 10

A user terminal determines, in an uplink reference signal position according to second higher layer signaling or first control information, an uplink reference signal symbol group corresponding to the user terminal and an uplink reference signal subcarrier group corresponding to the user terminal, where the second higher layer signaling or the first control information further includes indication information of the uplink reference signal subcarrier group corresponding to the user terminal ~ S1101

The user terminal sends an uplink reference signal in a time unit of the uplink reference signal symbol group corresponding to the user terminal in a time domain and a subcarrier of the uplink signal subcarrier group corresponding to the user terminal in a frequency domain ~ S1102

FIG. 11

A base station sends first higher layer signaling to a user terminal, where the first higher layer signaling is used by the user terminal to determine an uplink reference signal position, the uplink reference signal position includes at least one uplink reference signal symbol group, and each uplink reference signal symbol group includes at least one time unit ~ S1501

The base station sends second higher layer signaling to the user terminal, or sends first control information to the user terminal by using a physical channel, where the second higher layer signaling or the first control information includes indication information of an uplink reference signal symbol group corresponding to the user terminal, and the indication information of the uplink reference signal symbol group corresponding to the user terminal is used to instruct the user terminal to determine, in the uplink reference signal position, the uplink reference signal symbol group corresponding to the user terminal ~ S1502

The base station receives an uplink reference signal sent by the user terminal in a time unit of the uplink reference signal symbol group corresponding to the user terminal ~ S1503

FIG. 15

| A base station sends first uplink reference signal position information to a first user terminal, where the first uplink reference signal position information includes first time domain position information and first frequency domain position information | ∼ S1601 |

| The base station sends second uplink reference signal position information to a second user terminal, where the second uplink reference signal position information includes second time domain position information and second frequency domain position information | ∼ S1602 |

| The base station sends, to the first user terminal by using a physical channel, indication information of an uplink reference signal symbol group corresponding to the first user terminal and indication information of an uplink reference signal subcarrier group corresponding to the first user terminal | ∼ S1603 |

| The base station sends, to the second user terminal by using a physical channel, indication information of an uplink reference signal symbol group corresponding to the second user terminal and indication information of an uplink reference signal subcarrier group corresponding to the second user terminal | ∼ S1604 |

| The base station sends the first uplink reference signal position information and the second uplink reference signal position information to another base station by using an X2 interface, where the first uplink reference signal position information and the second uplink reference signal position information are used to make an uplink reference signal position of the another base station different from the uplink reference signal position information of the base station | ∼ S1605 |

| The first user terminal determines a first uplink reference signal position according to the first time domain position information and the first frequency domain position information, and determines, in the first uplink reference signal position according to the indication information of the uplink reference signal symbol group corresponding to the first user terminal and the indication information of the uplink reference signal subcarrier group corresponding to the first user terminal, the uplink reference signal symbol group corresponding to the first user terminal and the uplink reference signal subcarrier group corresponding to the first user terminal | ∼ S1606 |

| The base station sends indication information of a first codeword sequence to the first user terminal | ∼ S1607 |

CONT.
FROM
FIG. 16A

The first user terminal determines, according to the indication information of the first codeword sequence, the first codeword sequence corresponding to the first user terminal, and sends an uplink reference signal of the first user terminal to the base station in a time unit of the uplink reference signal symbol group corresponding to the first user terminal in a time domain and a subcarrier of the uplink reference signal subcarrier group corresponding to the first user terminal in a frequency domain by using the first codeword sequence ~ S1608

The second user terminal determines a second uplink reference signal position according to the second time domain position information and the second frequency domain position information, and determines, in the second uplink reference signal position according to the indication information of the uplink reference signal symbol group corresponding to the second user terminal and the indication information of the uplink reference signal subcarrier group corresponding to the second user terminal, the uplink reference signal symbol group corresponding to the second user terminal and the uplink reference signal subcarrier group corresponding to the second user terminal ~ S1609

The base station sends indication information of a second codeword sequence to the second user terminal ~ S1610

The second user terminal determines, according to the indication information of the second codeword sequence, the second codeword sequence of the second user terminal, and sends an uplink reference signal of the second user terminal to the base station in a time unit of the uplink reference signal symbol group corresponding to the second user terminal in the time domain and a subcarrier of the uplink reference signal subcarrier group corresponding to the second user terminal in the frequency domain by using the second codeword sequence ~ S1611

The base station receives, in the uplink reference signal symbol group corresponding to the first user terminal in the time domain and the uplink reference signal subcarrier group corresponding to the first user terminal in the frequency domain, the uplink reference signal of the first user terminal that is sent by the first user terminal by using the first codeword sequence, and receives, in the time unit of the uplink reference signal symbol group corresponding to the second user terminal in the time domain and the subcarrier of the uplink reference signal subcarrier group corresponding to the second user terminal in the frequency domain, the uplink reference signal of the second user terminal that is sent by the second user terminal by using the second codeword sequence ~ S1612

FIG. 16B

UPLINK REFERENCE SIGNAL TRANSMISSION METHOD, USER TERMINAL, AND BASE STATION

CROSS-REFERENCE TO RELATED APPLICATIONS

This application is a continuation of International Application No. PCT/CN2015/086842, filed on Aug. 13, 2015, the disclosure of which is hereby incorporated by reference in its entirety.

TECHNICAL FIELD

Embodiments of the present invention relate to communications technologies, and in particular, to an uplink reference signal transmission method, a user terminal, and a base station.

BACKGROUND

With fast development of wireless communications technologies, users have higher requirements for data transmission rates. A Long Term Evolution (LTE) communications technology can provide a high-rate data network by using a high-speed low-delay flat network architecture, so as to satisfy the increasing rate transmission requirements of the users.

In a current LTE system, a user terminal may send an uplink reference signal to a base station within a transmission time interval (TTI). The base station may perform channel sounding, channel estimation, or frequency offset estimation for the user terminal according to the uplink reference signal sent by the user terminal, so as to schedule the user terminal according to a result of the channel sounding, or calibrate a frequency of uplink data of the user terminal according to a result of the frequency offset estimation and then receive, according to the calibrated frequency and a result of the channel estimation, the data sent by the user terminal. The TTI in the current LTE system is 1 ms. The TTI may be reduced to implement a shorter round-trip time and a shorter data transmission delay. If the TTI is reduced, to ensure that the base station normally receives the data sent by the user terminal, and/or that the base station normally schedules the user terminal, the user terminal needs to send sufficient uplink reference signals to the base station. That is, within the TTI, the user terminal needs to have sufficient resources for sending the uplink reference signals.

However, when the TTI is reduced, ensuring that the user terminal sends sufficient uplink reference signals decreases a capacity of data transmission by the user terminal within the TTI, reduces efficiency of data transmission, and decreases an uplink capacity of the system.

SUMMARY

Embodiments of the present invention provide an uplink reference signal transmission method, a user terminal, and a base station to resolve problems that a quantity of user terminals supported by a base station is limited and that a capacity of a communications system is limited.

According to a first aspect, an embodiment of the present invention provides an uplink reference signal transmission method, including:

determining, by a user terminal, an uplink reference signal position according to first higher layer signaling, where the uplink reference signal position includes at least one uplink reference signal symbol group, and each uplink reference signal symbol group includes at least one time unit;

determining, by the user terminal, in the uplink reference signal position according to second higher layer signaling or received first control information of a physical channel, an uplink reference signal symbol group corresponding to the user terminal, where the second higher layer signaling or the first control information includes indication information of the uplink reference signal symbol group corresponding to the user terminal; and sending, by the user terminal, an uplink reference signal in a time unit of the uplink reference signal symbol group corresponding to the user terminal.

According to the first aspect, in a first possible implementation of the first aspect, if each uplink reference signal symbol group includes a plurality of time units, a time interval of at least one time unit exists between every two time units in the plurality of time units.

According to the first aspect or the first possible implementation of the first aspect, in a second possible implementation, the time unit is a time unit different from a preset time unit, and the preset time unit is a time unit of an uplink reference signal corresponding to a 1 ms transmission time interval TTI.

According to the first aspect or the first possible implementation of the first aspect, in a third possible implementation, the time unit includes a time unit in a preset time interval, and the preset time interval includes a guard period.

According to any one of the first aspect to the third possible implementation of the first aspect, in a fourth possible implementation, the uplink reference signal position further includes at least one uplink reference signal subcarrier group, and each uplink reference signal subcarrier group includes at least 12 uplink subcarriers;

before the sending, by the user terminal, an uplink reference signal in a time unit of the uplink reference signal symbol group corresponding to the user terminal, the method further includes:

determining, by the user terminal, in the uplink reference signal position according to the second higher layer signaling or the first control information, the uplink reference signal symbol group corresponding to the user terminal and an uplink reference signal subcarrier group corresponding to the user terminal, where the second higher layer signaling or the first control information further includes indication information of the uplink reference signal subcarrier group corresponding to the user terminal; and the sending, by the user terminal, an uplink reference signal in a time unit of the uplink reference signal symbol group corresponding to the user terminal includes:

sending, by the user terminal, the uplink reference signal in the time unit of the uplink reference signal symbol group corresponding to the user terminal in a time domain and a subcarrier of the uplink signal subcarrier group corresponding to the user terminal in a frequency domain.

According to the fourth possible implementation of the first aspect, in a fifth possible implementation, a frequency spacing of at least one subcarrier exists between every two subcarriers in the at least 12 uplink subcarriers.

According to any one of the first aspect to the fifth possible implementation of the first aspect, in a sixth possible implementation, the determining, by a user terminal, an uplink reference signal position according to first higher layer signaling includes:

determining, by the user terminal, uplink reference signal position information according to the first higher layer signaling, where the uplink reference signal position information includes frequency domain position information; and determining, by the user terminal, the uplink reference signal position in a preset timeslot or subframe according to the frequency domain position information.

According to any one of the first aspect to the fifth possible implementation of the first aspect, in a seventh possible implementation, the determining, by a user terminal, an uplink reference signal position according to first higher layer signaling includes:

determining, by the user terminal, uplink reference signal position information according to the first higher layer signaling, where the uplink reference signal position information includes time domain position information and frequency domain position information; and determining, by the user terminal, the uplink reference signal position according to the frequency domain position information and the time domain position information.

According to any one of the first aspect to the seventh possible implementation of the first aspect, in an eighth possible implementation, before the sending, by the user terminal, an uplink reference signal in a time unit of the uplink reference signal symbol group corresponding to the user terminal, the method further includes:

determining, by the user terminal according to third higher layer signaling or received second control information of the physical channel, at least one codeword sequence corresponding to the user terminal, where the third higher layer signaling or the second control information includes indication information of the codeword sequence corresponding to the user terminal; and correspondingly, the sending, by the user terminal, an uplink reference signal in a time unit of the uplink reference signal symbol group corresponding to the user terminal includes:

sending, by the user terminal, the uplink reference signal in the time unit of the uplink reference signal symbol group corresponding to the user terminal by using the at least one codeword sequence corresponding to the user terminal.

According to any one of the first aspect to the eighth possible implementation of the first aspect, in a ninth possible implementation, the time unit is a time unit corresponding to a single carrier frequency division multiple access SC-FDMA symbol, or a time unit corresponding to an orthogonal frequency division multiple access OFDMA symbol.

According to any one of the first aspect to the ninth possible implementation of the first aspect, in a tenth possible implementation, the uplink reference signal includes a demodulation reference signal DM-RS and/or a sounding reference signal SRS.

According to a second aspect, an embodiment of the present invention further provides an uplink reference signal transmission method, including:

sending, by a base station, first higher layer signaling to a user terminal, where the first higher layer signaling is used by the user terminal to determine an uplink reference signal position, the uplink reference signal position includes at least one uplink reference signal symbol group, and each uplink reference signal symbol group includes at least one time unit;

sending, by the base station, second higher layer signaling to the user terminal, or sending first control information to the user terminal by using a physical channel, where the second higher layer signaling or the first control information includes indication information of an uplink reference signal symbol group corresponding to the user terminal, and the indication information of the uplink reference signal symbol group corresponding to the user terminal is used to instruct the user terminal to determine, in the uplink reference signal position, the uplink reference signal symbol group corresponding to the user terminal; and receiving, by the base station, an uplink reference signal sent by the user terminal in a time unit of the uplink reference signal symbol group corresponding to the user terminal.

According to the second aspect, in a first possible implementation of the second aspect, if each uplink reference signal symbol group includes a plurality of time units, a time interval of at least one symbol exists between every two time units in the plurality of time units.

According to the second aspect or the first possible implementation of the second aspect, in a second possible implementation, the time unit is a time unit different from a preset time unit, and the preset time unit is a time unit of an uplink reference signal corresponding to a 1 ms transmission time interval TTI.

According to the second aspect or the first possible implementation of the second aspect, in a third possible implementation, the time unit is a time unit in a preset time interval, and the preset time interval includes a guard period GP.

According to any one of the second aspect to the third possible implementation of the second aspect, in a fourth possible implementation, the uplink reference signal position includes at least one uplink reference signal subcarrier group, and each uplink reference signal subcarrier group includes at least 12 uplink subcarriers;

the second higher layer signaling or the first control information further includes indication information of an uplink reference signal subcarrier group corresponding to the user terminal, and the indication information of the uplink reference signal subcarrier group corresponding to the user terminal is used to instruct the user terminal to determine, in the uplink reference signal position, the uplink reference signal subcarrier group corresponding to the user terminal; and the receiving, by the base station, an uplink reference signal sent by the user terminal in a time unit of the uplink reference signal symbol group corresponding to the user terminal includes:

receiving, by the base station, the uplink reference signal sent by the user terminal in the time unit of the uplink reference signal symbol group corresponding to the user terminal in a time domain and a subcarrier of the uplink signal subcarrier group corresponding to the user terminal in a frequency domain.

According to the fourth possible implementation of the second aspect, in a fifth possible implementation, a frequency spacing of at least one subcarrier exists between every two subcarriers in the at least 12 subcarriers.

According to any one of the second aspect to the fifth possible implementation of the second aspect, in a sixth possible implementation, the first higher layer signaling includes uplink reference signal position information, where the uplink reference signal position information includes frequency domain position information; and the frequency domain position information is used by the user terminal to determine the uplink reference signal position in a preset timeslot or subframe.

According to any one of the second aspect to the fifth possible implementation of the second aspect, in a seventh possible implementation, the first higher layer signaling includes uplink reference signal position information, where the uplink reference signal position information includes time domain position information and frequency domain position information; and the time domain position information and the frequency domain position information are used by the user terminal to determine the uplink reference signal position.

According to the sixth or the seventh possible implementation of the second aspect, in an eighth possible implementation, the method further includes:

sending, by the base station, the uplink reference signal position information to another base station by using an X2 interface, where the uplink reference signal position information is used to make an uplink reference signal position of the another base station different from the uplink reference signal position of the base station.

According to any one of the second aspect to the eighth possible implementation of the second aspect, in a ninth possible implementation, before the receiving, by the base station, an uplink reference signal sent by the user terminal in a time unit of the uplink reference signal symbol group corresponding to the user terminal, the method further includes:

sending, by the base station, third higher layer signaling to the user terminal, or sending second control information to the user terminal by using the physical channel, where the third higher layer signaling or the second control information includes indication information of a codeword sequence corresponding to the user terminal, and the indication information of the codeword sequence corresponding to the user terminal is used to instruct the user terminal to determine at least one codeword sequence corresponding to the user terminal; and the receiving, by the base station, an uplink reference signal sent by the user terminal in a time unit of the uplink reference signal symbol group corresponding to the user terminal includes:

receiving, by the base station, the uplink reference signal sent by the user terminal in the time unit of the uplink reference signal symbol group corresponding to the user terminal by using the at least one codeword sequence corresponding to the user terminal.

According to any one of the second aspect to the ninth possible implementation of the second aspect, in a tenth possible implementation, the time unit is a time unit corresponding to a single carrier frequency division multiple access SC-FDMA symbol, or a time unit corresponding to an orthogonal frequency division multiple access OFDMA symbol.

According to any one of the second aspect to the tenth possible implementation of the second aspect, in an eleventh possible implementation, the uplink reference signal includes a demodulation reference signal DM-RS and/or a sounding reference signal SRS.

According to a third aspect, an embodiment of the present invention further provides a user terminal, including:

a determining module, configured to determine an uplink reference signal position according to first higher layer signaling, where the uplink reference signal position includes at least one uplink reference signal symbol group, and each uplink reference signal symbol group includes at least one time unit; and determine, in the uplink reference signal position according to second higher layer signaling or received first control information of a physical channel, an uplink reference signal symbol group corresponding to the user terminal, where the second higher layer signaling or the first control information includes indication information of the uplink reference signal symbol group corresponding to the user terminal; and a sending module, configured to send an uplink reference signal in a time unit of the uplink reference signal symbol group corresponding to the user terminal.

According to the third aspect, in a first possible implementation of the third aspect, if each uplink reference signal symbol group includes a plurality of time units, a time interval of at least one time unit exists between every two time units in the plurality of time units.

According to the third aspect or the first possible implementation of the third aspect, in a second possible implementation, the time unit is a time unit different from a preset time unit, and the preset time unit is a time unit of an uplink reference signal corresponding to a 1 ms transmission time interval TTI.

According to the third aspect or the first possible implementation of the third aspect, in a third possible implementation, the time unit includes a time unit in a preset time interval, and the preset time interval includes a guard period.

According to any one of the third aspect to the third possible implementation of the third aspect, in a fourth possible implementation, the uplink reference signal position further includes at least one uplink reference signal subcarrier group, and each uplink reference signal subcarrier group includes at least 12 uplink subcarriers;

the determining module is further configured to determine, in the uplink reference signal position according to the second higher layer signaling or the first control information, the uplink reference signal symbol group corresponding to the user terminal and an uplink reference signal subcarrier group corresponding to the user terminal, where the second higher layer signaling or the first control information further includes indication information of the uplink reference signal subcarrier group corresponding to the user terminal; and the sending module is specifically configured to send the uplink reference signal in the time unit of the uplink reference signal symbol group corresponding to the user terminal in a time domain and a subcarrier of the uplink signal subcarrier group corresponding to the user terminal in a frequency domain.

According to the fourth possible implementation of the third aspect, in a fifth possible implementation, a frequency spacing of at least one subcarrier exists between every two subcarriers in the at least 12 uplink subcarriers.

According to any one of the third aspect to the fifth possible implementation of the third aspect, in a sixth possible implementation, the determining module is further configured to determine uplink reference signal position information according to the first higher layer signaling, where the uplink reference signal position information includes frequency domain position information; and determine the uplink reference signal position in a preset timeslot or subframe according to the frequency domain position information.

According to any one of the third aspect to the fifth possible implementation of the third aspect, in a seventh possible implementation, the determining module is further configured to determine uplink reference signal position information according to the first higher layer signaling, where the uplink reference signal position information includes time domain position information and frequency domain position information; and determine the uplink reference signal position according to the frequency domain position information and the time domain position information.

According to any one of the third aspect to the seventh possible implementation of the third aspect, in an eighth possible implementation, the determining module is further configured to determine, according to third higher layer signaling or received second control information of the physical channel, at least one codeword sequence corresponding to the user terminal, where the third higher layer signaling or the second control information includes indication information of the codeword sequence corresponding to the user terminal; and the sending module is specifically configured to send the uplink reference signal in the time unit of the uplink reference signal symbol group corresponding to the user terminal by using the at least one codeword sequence corresponding to the user terminal.

According to any one of the third aspect to the eighth possible implementation of the third aspect, in a ninth possible implementation, the time unit is a time unit corresponding to a single carrier frequency division multiple access SC-FDMA symbol, or a time unit corresponding to an orthogonal frequency division multiple access OFDMA symbol.

According to any one of the third aspect to the ninth possible implementation of the third aspect, in a tenth possible implementation, the uplink reference signal includes a demodulation reference signal DM-RS and/or a sounding reference signal SRS.

According to a fourth aspect, an embodiment of the present invention further provides a base station, including:
 a sending module, configured to send first higher layer signaling to a user terminal, and send second higher layer signaling to the user terminal or send first control information to the user terminal by using a physical channel, where the first higher layer signaling is used by the user terminal to determine an uplink reference signal position, the uplink reference signal position includes at least one uplink reference signal symbol group, and each uplink reference signal symbol group includes at least one time unit; the second higher layer signaling or the first control information includes indication information of an uplink reference signal symbol group corresponding to the user terminal, and the indication information of the uplink reference signal symbol group corresponding to the user terminal is used to instruct the user terminal to determine, in the uplink reference signal position, the uplink reference signal symbol group corresponding to the user terminal; and
 a receiving module, configured to receive an uplink reference signal sent by the user terminal in a time unit of the uplink reference signal symbol group corresponding to the user terminal.

According to the fourth aspect, in a first possible implementation of the fourth aspect, if each uplink reference signal symbol group includes a plurality of time units, a time interval of at least one symbol exists between every two time units in the plurality of time units.

According to the fourth aspect or the first possible implementation of the fourth aspect, in a second possible implementation, the time unit is a time unit different from a preset time unit, and the preset time unit is a time unit of an uplink reference signal corresponding to a 1 ms transmission time interval TTI.

According to the fourth aspect or the first possible implementation of the fourth aspect, in a third possible implementation, the time unit is a time unit in a preset time interval, and the preset time interval includes a guard period GP.

According to any one of the fourth aspect to the third possible implementation of the fourth aspect, in a fourth possible implementation, the uplink reference signal position includes at least one uplink reference signal subcarrier group, and each uplink reference signal subcarrier group includes at least 12 uplink subcarriers;
 the second higher layer signaling or the first control information further includes indication information of an uplink reference signal subcarrier group corresponding to the user terminal, and the indication information of the uplink reference signal subcarrier group corresponding to the user terminal is used to instruct the user terminal to determine, in the uplink reference signal position, the uplink reference signal subcarrier group corresponding to the user terminal; and
 the receiving module is specifically configured to receive the uplink reference signal sent by the user terminal in the time unit of the uplink reference signal symbol group corresponding to the user terminal in a time domain and a subcarrier of the uplink signal subcarrier group corresponding to the user terminal in a frequency domain.

According to the fourth possible implementation of the fourth aspect, in a fifth possible implementation, a frequency spacing of at least one subcarrier exists between every two subcarriers in the at least 12 subcarriers.

According to any one of the fourth aspect to the fifth possible implementation of the fourth aspect, in a sixth possible implementation, the first higher layer signaling includes uplink reference signal position information, where the uplink reference signal position information includes frequency domain position information; and
 the frequency domain position information is used by the user terminal to determine the uplink reference signal position in a preset timeslot or subframe.

According to any one of the fourth aspect to the fifth possible implementation of the fourth aspect, in a seventh possible implementation, the first higher layer signaling includes uplink reference signal position information, where the uplink reference signal position information includes time domain position information and frequency domain position information; and
 the time domain position information and the frequency domain position information are used by the user terminal to determine the uplink reference signal position.

According to the sixth or the seventh possible implementation of the fourth aspect, in an eighth possible implementation, the sending module is specifically configured to send the uplink reference signal position information to another base station by using an X2 interface, where the uplink reference signal position information is used to make an uplink reference signal position of the another base station different from the uplink reference signal position of the base station.

According to any one of the fourth aspect to the eighth possible implementation of the fourth aspect, in a ninth possible implementation, the sending module is further configured to send third higher layer signaling to the user terminal, or send second control information to the user terminal by using the physical channel, where the third higher layer signaling or the second control information includes indication information of a codeword sequence corresponding to the user terminal, and the indication information of the codeword sequence corresponding to the user terminal is used to instruct the user terminal to determine at least one codeword sequence corresponding to the user terminal; and the receiving module is specifically configured to receive the uplink reference signal sent by the user terminal in the time unit of the uplink reference signal symbol group corresponding to the user terminal by using the at least one codeword sequence corresponding to the user terminal.

According to any one of the fourth aspect to the ninth possible implementation of the fourth aspect, in a tenth possible implementation, the time unit is a time unit corresponding to a single carrier frequency division multiple access SC-FDMA symbol, or a time unit corresponding to an orthogonal frequency division multiple access OFDMA symbol.

According to any one of the fourth aspect to the tenth possible implementation of the fourth aspect, in an eleventh possible implementation, the uplink reference signal includes a demodulation reference signal DM-RS and/or a sounding reference signal SRS.

According to a fifth aspect, an embodiment of the present invention further provides a user terminal, including a processor and a transmitter, where the processor is configured to determine an uplink reference signal position according to first higher layer signaling, where the uplink reference signal position includes at least one uplink reference signal symbol group, and each uplink reference signal symbol group includes at least one time unit; and determine, in the uplink reference signal position according to second higher layer signaling or received first control information of a physical channel, an uplink reference signal symbol group corresponding to the user terminal, where the second higher layer signaling or the first control information includes indication information of the uplink reference signal symbol group corresponding to the user terminal; and the transmitter is configured to send an uplink reference signal in a time unit of the uplink reference signal symbol group corresponding to the user terminal.

According to the fifth aspect, in a first possible implementation of the fifth aspect, if each uplink reference signal symbol group includes a plurality of time units, a time interval of at least one time unit exists between every two time units in the plurality of time units.

According to the fifth aspect or the first possible implementation of the fifth aspect, in a second possible implementation, the time unit is a time unit different from a preset time unit, and the preset time unit is a time unit of an uplink reference signal corresponding to a 1 ms transmission time interval TTI.

According to the fifth aspect or the first possible implementation of the fifth aspect, in a third possible implementation, the time unit includes a time unit in a preset time interval, and the preset time interval includes a guard period.

According to any one of the fifth aspect to the third possible implementation of the fifth aspect, in a fourth possible implementation, the uplink reference signal position further includes at least one uplink reference signal subcarrier group, and each uplink reference signal subcarrier group includes at least 12 uplink subcarriers;

the processor is further configured to determine, in the uplink reference signal position according to the second higher layer signaling or the first control information, the uplink reference signal symbol group corresponding to the user terminal and an uplink reference signal subcarrier group corresponding to the user terminal, where the second higher layer signaling or the first control information further includes indication information of the uplink reference signal subcarrier group corresponding to the user terminal; and the transmitter is specifically configured to send the uplink reference signal in the time unit of the uplink reference signal symbol group corresponding to the user terminal in a time domain and a subcarrier of the uplink signal subcarrier group corresponding to the user terminal in a frequency domain.

According to the fourth possible implementation of the fifth aspect, in a fifth possible implementation, a frequency spacing of at least one subcarrier exists between every two subcarriers in the at least 12 uplink subcarriers.

According to any one of the fifth aspect to the fifth possible implementation of the fifth aspect, in a sixth possible implementation, the processor is further configured to determine uplink reference signal position information according to the first higher layer signaling, where the uplink reference signal position information includes frequency domain position information; and determine the uplink reference signal position in a preset timeslot or subframe according to the frequency domain position information.

According to any one of the fifth aspect to the fifth possible implementation of the fifth aspect, in a seventh possible implementation, the processor is further configured to determine uplink reference signal position information according to the first higher layer signaling, where the uplink reference signal position information includes time domain position information and frequency domain position information; and determine the uplink reference signal position according to the frequency domain position information and the time domain position information.

According to any one of the fifth aspect to the seventh possible implementation of the fifth aspect, in an eighth possible implementation, the processor is further configured to determine, according to third higher layer signaling or received second control information of the physical channel, at least one codeword sequence corresponding to the user terminal, where the third higher layer signaling or the second control information includes indication information of the codeword sequence corresponding to the user terminal; and the transmitter is specifically configured to send the uplink reference signal in the time unit of the uplink reference signal symbol group corresponding to the user terminal by using the at least one codeword sequence corresponding to the user terminal.

According to any one of the fifth aspect to the eighth possible implementation of the fifth aspect, in a ninth possible implementation, the time unit is a time unit corresponding to a single carrier frequency division multiple access SC-FDMA symbol, or a time unit corresponding to an orthogonal frequency division multiple access OFDMA symbol.

According to any one of the fifth aspect to the ninth possible implementation of the fifth aspect, in a tenth possible implementation, the uplink reference signal includes a demodulation reference signal DM-RS and/or a sounding reference signal SRS.

According to a sixth aspect, an embodiment of the present invention provides a base station, including a transmitter and a receiver, where the transmitter is configured to send first higher layer signaling to a user terminal, and send second higher layer signaling to the user terminal or send first control information to the user terminal by using a physical channel, where the first higher layer signaling is used by the user terminal to determine an uplink reference signal position, the uplink reference signal position includes at least one uplink reference signal symbol group, and each uplink reference signal symbol group includes at least one time unit; the second higher layer signaling or the first control information includes indication information of an uplink reference signal symbol group corresponding to the user terminal, and the indication information of the uplink reference signal symbol group corresponding to the user terminal is used to instruct the user terminal to determine, in the uplink reference signal position, the uplink reference signal symbol group corresponding to the user terminal; and the receiver is configured to receive an uplink reference signal sent by the user terminal in a time unit of the uplink reference signal symbol group corresponding to the user terminal.

According to the sixth aspect, in a first possible implementation of the sixth aspect, if each uplink reference signal symbol group includes a plurality of time units, a time interval of at least one symbol exists between every two time units in the plurality of time units.

According to the sixth aspect or the first possible implementation of the sixth aspect, in a second possible implementation, the time unit is a time unit different from a preset time unit, and the preset time unit is a time unit of an uplink reference signal corresponding to a 1 ms transmission time interval TTI.

According to the sixth aspect or the first possible implementation of the sixth aspect, in a third possible implementation, the time unit is a time unit in a preset time interval, and the preset time interval includes a guard period GP.

According to any one of the sixth aspect to the third possible implementation of the sixth aspect, in a fourth possible implementation, the uplink reference signal position includes at least one uplink reference signal subcarrier group, and each uplink reference signal subcarrier group includes at least 12 uplink subcarriers;

the second higher layer signaling or the first control information further includes indication information of an uplink reference signal subcarrier group corresponding to the user terminal, and the indication information of the uplink reference signal subcarrier group corresponding to the user terminal is used to instruct the user terminal to determine, in the uplink reference signal position, the uplink reference signal subcarrier group corresponding to the user terminal; and the receiver is specifically configured to receive the uplink reference signal sent by the user terminal in the time unit of the uplink reference signal symbol group corresponding to the user terminal in a time domain and a subcarrier of the uplink signal subcarrier group corresponding to the user terminal in a frequency domain.

According to the fourth possible implementation of the sixth aspect, in a fifth possible implementation, a frequency spacing of at least one subcarrier exists between every two subcarriers in the at least 12 subcarriers.

According to any one of the sixth aspect to the fifth possible implementation of the sixth aspect, in a sixth possible implementation, the first higher layer signaling includes uplink reference signal position information, where the uplink reference signal position information includes frequency domain position information; and the frequency domain position information is used by the user terminal to determine the uplink reference signal position in a preset timeslot or subframe.

According to any one of the sixth aspect to the fifth possible implementation of the sixth aspect, in a seventh possible implementation, the first higher layer signaling includes uplink reference signal position information, where the uplink reference signal position information includes time domain position information and frequency domain position information; and the time domain position information and the frequency domain position information are used by the user terminal to determine the uplink reference signal position.

According to the sixth or the seventh possible implementation of the sixth aspect, in an eighth possible implementation, the transmitter is specifically configured to send the uplink reference signal position information to another base station by using an X2 interface, where the uplink reference signal position information is used to make an uplink reference signal position of the another base station different from the uplink reference signal position of the base station.

According to any one of the sixth aspect to the eighth possible implementation of the sixth aspect, in a ninth possible implementation, the transmitter is further configured to send third higher layer signaling to the user terminal, or send second control information to the user terminal by using the physical channel, where the third higher layer signaling or the second control information includes indication information of a codeword sequence corresponding to the user terminal, and the indication information of the codeword sequence corresponding to the user terminal is used to instruct the user terminal to determine at least one codeword sequence corresponding to the user terminal; and the receiver is specifically configured to receive the uplink reference signal sent by the user terminal in the time unit of the uplink reference signal symbol group corresponding to the user terminal by using the at least one codeword sequence corresponding to the user terminal.

According to any one of the sixth aspect to the ninth possible implementation of the sixth aspect, in a tenth possible implementation, the time unit is a time unit corresponding to a single carrier frequency division multiple access SC-FDMA symbol, or a time unit corresponding to an orthogonal frequency division multiple access OFDMA symbol.

According to any one of the sixth aspect to the tenth possible implementation of the sixth aspect, in an eleventh possible implementation, the uplink reference signal includes a demodulation reference signal DM-RS and/or a sounding reference signal SRS.

According to the uplink reference signal transmission method, user terminal, and base station provided by the embodiments of the present invention, the user terminal may determine the uplink reference signal position according to the first higher layer signaling, where the uplink reference signal position includes the at least one uplink reference signal symbol group, and each uplink reference signal symbol group includes the at least one time unit; and the user terminal determines, in the uplink reference signal position according to the indication information that is of the uplink reference signal symbol group corresponding to the user terminal and is included in the second higher layer signaling or the first control information, the uplink reference signal symbol group corresponding to the user terminal, and then sends the uplink reference signal in the uplink reference signal symbol group corresponding to the user terminal. That is, each user terminal may send, in the uplink reference signal position, an uplink reference signal in an uplink reference signal symbol group corresponding to the user terminal. Even if a TTI is reduced, to ensure that each user terminal sends sufficient uplink reference signals, a quantity of time units in the uplink reference signal symbol group corresponding to the user terminal and/or a quantity of subcarriers of time units in the uplink reference signal symbol group corresponding to the user terminal may be increased in the uplink reference signal position, and there is no need to add a time unit corresponding to an uplink reference signal in every TTI. Therefore, a data transmission rate is ensured, and an uplink capacity of a system is ensured.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

FIG. 2 is a schematic structural diagram of a radio frame in an FDD communications system;

FIG. 3 is a flowchart of an uplink reference signal transmission method according to Embodiment 1 of the present invention;

FIG. 10 is a schematic structural diagram of an uplink reference signal position in a timeslot according to Embodiment 2 of the present invention;

FIG. 11 is a flowchart of an uplink reference signal transmission method according to Embodiment 2 of the present invention;

FIG. 15 is a flowchart of an uplink reference signal transmission method according to Embodiment 3 of the present invention;

FIG. 16A and FIG. 16B are a flowchart of an uplink reference signal transmission method according to Embodiment 4 of the present invention;

DESCRIPTION OF EMBODIMENTS

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

The solution of each embodiment of the present invention is applicable to an LTE communications system or an evolved LTE communications system, such as a Long Term Evolution-Advanced (LTE-A) communications system. The LTE communications system or the LTE-A communications system includes a time division duplex (TDD) communications system and a frequency division duplex (FDD) communications system.

Figure 1:
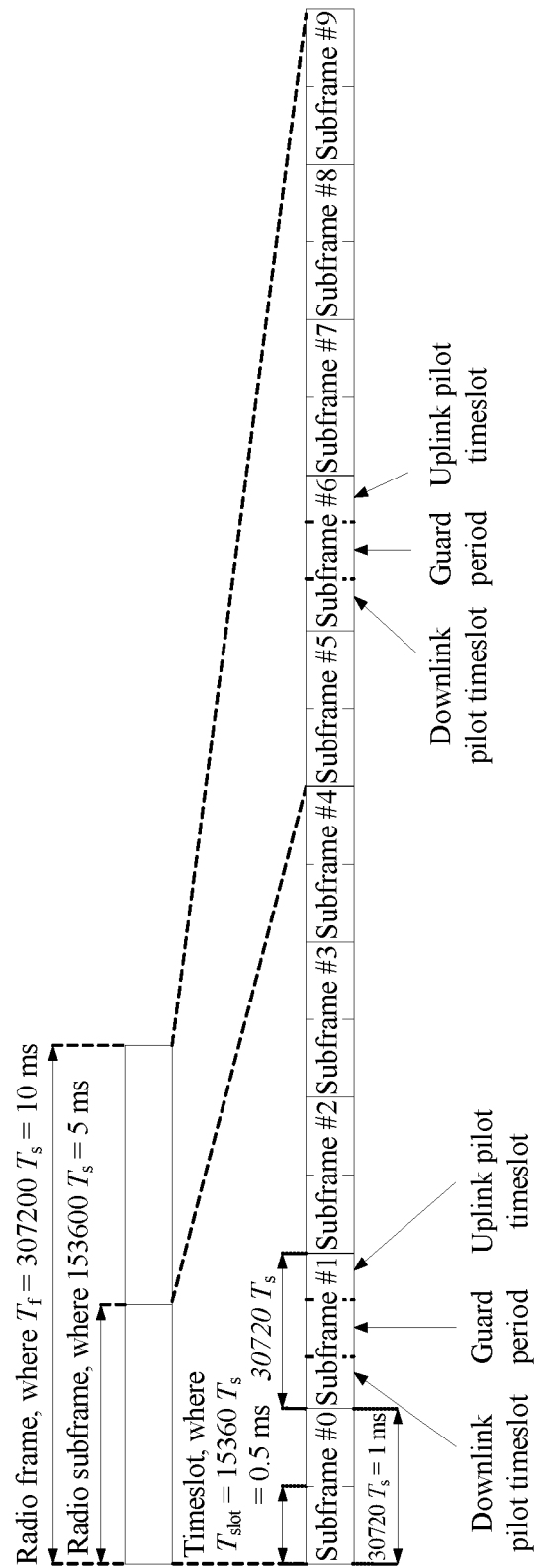
FIG. 1 is a schematic structural diagram of a radio frame in a TDD communications system.

FIG. 1 is a schematic structural diagram of a radio frame in a TDD communications system. As shown in FIG. 1, in the TDD communications system, a radio frame may include 10 subframes: a subframe #0 to a subframe #9, and each subframe includes two 0.5 ms timeslots. The 10 subframes may include uplink subframes, downlink subframes, and special subframes. Specific subframes corresponding to the uplink subframes, the downlink subframes, and the special subframes may be determined according to uplink-downlink configuration information and a table of correspondences between the uplink-downlink configuration information and subframe numbers. Correspondences between uplink-downlink configurations and subframe numbers in the TDD communications system may be shown in the following Table 1.

Given a normal cyclic prefix (NCP), a slot includes seven time units. Given an extended cyclic prefix (ECP), a slot includes six time units. In a frequency domain, every 12 subcarriers form a 180 kHz resource element (RE). A minimum time-frequency resource unit is an RE. The RE is a two-dimensional resource including one subcarrier in a frequency domain and duration of one time unit in time domain. A resource block (RB) is a resource block including one slot in the time domain and 12 subcarriers in the

TABLE 1

| Uplink-downlink configuration | Downlink-to-uplink switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | S | U |
| 1 | 5 ms | D | S | U | U | D | D | S | U | S | U |
| 2 | 5 ms | D | S | U | D | D | D | S | U | S | U |
| 3 | 10 ms | D | S | U | U | U | D | D | D | S | U |
| 4 | 10 ms | D | S | U | U | D | D | D | D | S | U |
| 5 | 10 ms | D | S | U | D | D | D | D | D | S | U |
| 6 | 5 ms | D | S | U | U | U | D | S | U | S | U |

In Table 1, D is a downlink subframe, S is a special subframe, and U is an uplink subframe.

As can be learned from FIG. 1, a special subframe in the TDD communications system includes a downlink pilot timeslot (DwPTS), a guard period (GP), and an uplink pilot timeslot (UpPTS). Lengths corresponding to the DwPTS, the GP, and the UpPTS in the special subframe may be determined according to the following Table 2.

frequency domain. For a normal cyclic prefix, an RB includes 84 REs. For an extended cyclic prefix, an RB includes 72 REs.

In each embodiment of the present invention, a TTI may be a subframe, or may be a timeslot, or even may be a time unit. If the TTI is a subframe, the TTI is 1 ms. If the TTI is a timeslot, the TTI may be 0.5 ms. If the TTI is a time unit, the TTI may be duration of the time unit, and the time unit

TABLE 2

| | Downlink with a normal cyclic prefix | | | Downlink with an extended cyclic prefix | | |
|---|---|---|---|---|---|---|
| | | Uplink pilot timeslot | | | Uplink pilot timeslot | |
| Special subframe configuration | Downlink pilot timeslot | Uplink with a normal cyclic prefix | Uplink with an extended cyclic prefix | Downlink pilot timeslot | Uplink with a normal cyclic prefix | Uplink with an extended cyclic prefix |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

As can be learned from FIG. 1, a total length of the special subframe is 30720 $T_s$. With reference to lengths of the DwPTS and the UpPTS in the special subframe in Table 2, a length of the GP in the special subframe may be determined.

FIG. 2 is a schematic structural diagram of a radio frame in an FDD communications system. As shown in FIG. 2, in the FDD communications system, a radio frame may include 20 timeslots: a timeslot #0 to a timeslot #19. The 20 timeslots may be grouped into 10 subframes, and each subframe includes two 0.5 ms timeslots.

In an LTE communications system, transmission resources are classified according to time and frequencies. In a time domain, a maximum time unit is a 10 ms radio frame. This radio frame is divided into ten 1 ms subframes, and each subframe is further divided into two 0.5 ms timeslots.

may be an orthogonal frequency division multiple access (OFDMA) symbol or a single carrier frequency division multiple access (SC-FDMA) symbol in an LTE system with a 15 kHz subcarrier spacing, or a symbol in a communications system with a greater subcarrier spacing. It should be noted that the TTI in each embodiment of the present invention may also include a plurality of time units but is shorter than a timeslot.

Embodiment 1 of the present invention provides an uplink reference signal transmission method. A user terminal may send an uplink reference signal of the user terminal to a base station by performing the uplink reference signal transmission method in Embodiment 1. After receiving the uplink reference signal sent by the user terminal, the base station performs channel sounding, channel estimation, or frequency offset estimation for the user terminal according to the uplink reference signal, so as to schedule the user terminal according to a result of the channel sounding, or calibrate a frequency of uplink data of the user terminal according to a result of the frequency offset estimation and then receive, according to the calibrated frequency and a result of the channel estimation, the data sent by the user terminal.

FIG. 3 is a flowchart of an uplink reference signal transmission method according to Embodiment 1 of the present invention. As shown in FIG. 3, the uplink reference signal transmission method may include the following steps.

S301. A user terminal determines an uplink reference signal position according to first higher layer signaling, where the uplink reference signal position includes at least one uplink reference signal symbol group, and each uplink reference signal symbol group includes at least one time unit.

Specifically, the user terminal may be, for example, user equipment (UE), a mobile station (MS), or a mobile terminal. The mobile terminal may be, for example, a mobile phone, a notebook computer, or a tablet computer. The first higher layer signaling may be any higher layer signaling received by the user terminal. The first higher layer signaling may be radio resource control (RRC) signaling, medium access control (MAC) signaling, or other signaling. The base station may be a base station serving a cell in which the user terminal is located. The uplink reference signal position may include uplink reference signal positions of a plurality of user terminals in the cell of the base station. That is, in the method of Embodiment 1 of the present invention, the plurality of user terminals in the cell of the base station send, in the uplink reference signal position, uplink reference signals in uplink reference signal symbol groups corresponding to the user terminals.

The uplink reference signal position includes at least one uplink reference signal symbol group, where each uplink reference signal symbol group includes at least one time unit. Each user terminal in the plurality of user terminals may correspond to an uplink reference signal symbol group in the uplink reference signal position. Uplink reference signal symbol groups corresponding to different user terminals in the plurality of user terminals may be the same or may be different. If the uplink reference signal symbol groups corresponding to the different user terminals are the same, that is, time domain positions of uplink reference signals of the different user terminals are the same, frequency domain positions of the uplink reference signals of the different user terminals are different, and/or codeword sequences of the uplink reference signals of the different user terminals are different. If the uplink reference signal symbol groups corresponding to the different user terminals are different, that is, the time domain positions of the uplink reference signals of the different user terminals are the same, the frequency domain positions of the uplink reference signals of the different user terminals may be the same or may be different, and the codeword sequences of the uplink reference signals of the different user terminals may be the same or may be different.

The time unit of the at least one uplink reference signal symbol group included in the uplink reference signal position may include a subframe or a time unit in a timeslot.

S302. The user terminal determines, in the uplink reference signal position according to second higher layer signaling or received first control information of a physical channel, an uplink reference signal symbol group corresponding to the user terminal, where the second higher layer signaling or the first control information includes indication information of the uplink reference signal symbol group corresponding to the user terminal.

Specifically, the second higher layer signaling may also be any higher layer signaling received by the user terminal. The second higher layer signaling may be the same as or different from the first higher layer signaling. The physical channel may be a downlink physical channel, for example, a physical downlink control channel (PDCCH), or an enhanced physical downlink control channel (EPDCCH).

Because the uplink reference signal position includes the uplink reference signal positions of the plurality of user terminals, the user terminal may determine, from the uplink reference signal positions of the plurality of user terminals according to the indication information of the uplink reference signal symbol group corresponding to the user terminal in the second higher layer signaling or the first control information, the uplink reference signal symbol group corresponding to the user terminal. The indication information of the uplink reference signal symbol group corresponding to the user terminal may include an identifier of the uplink reference signal symbol group corresponding to the user terminal, and/or an identifier of a time unit in the uplink reference signal symbol group corresponding to the user terminal.

S303. The user terminal sends an uplink reference signal in a time unit of the uplink reference signal symbol group corresponding to the user terminal.

Specifically, the user terminal may send the uplink reference signal in at least one time unit of the uplink reference signal symbol group corresponding to the user terminal. The user terminal may further send uplink data in a time-frequency position different from the uplink reference signal position.

In the uplink reference signal transmission method provided by Embodiment 1 of the present invention, the user terminal may determine the uplink reference signal position according to the first higher layer signaling, where the uplink reference signal position includes the at least one uplink reference signal symbol group, and each uplink reference signal symbol group includes the at least one time unit; and the user terminal determines, in the uplink reference signal position according to the indication information that is of the uplink reference signal symbol group corresponding to the user terminal and is included in the second higher layer signaling or the first control information, the uplink reference signal symbol group corresponding to the user terminal, and then sends the uplink reference signal in the uplink reference signal symbol group corresponding to the user terminal. That is, each user terminal may send, in the uplink reference signal position, an uplink reference signal in an uplink reference signal symbol group corresponding to the user terminal. Because the user terminal sends, in the uplink reference signal position, the uplink signal in the uplink reference signal symbol group corresponding to the user terminal, uplink data and the uplink reference signal sent by the user terminal are sent separately on different time-frequency resources. Even if a TTI is reduced, sufficient uplink reference signals may still be sent in the uplink reference signal position, and there is no need to add a time unit corresponding to an uplink reference signal in the TTI. Therefore, a data transmission rate is ensured, and an uplink capacity of a system is ensured.

Embodiment 2 of the present invention further provides an uplink reference signal transmission method. Optionally, if each uplink reference signal symbol group includes a plurality of time units, a time interval of at least one time unit exists between every two time units in the plurality of time units.

Specifically, if each uplink reference signal symbol group includes a plurality of time units, the uplink reference signal symbol group corresponding to the user terminal includes a plurality of time units. The user terminal sends the uplink reference signal in the plurality of time units in which the time interval of at least one time unit exists between every two time units. Therefore, a result of frequency offset estimation performed by the base station after the base station receives the uplink reference signal is more accurate.

Figure 4:
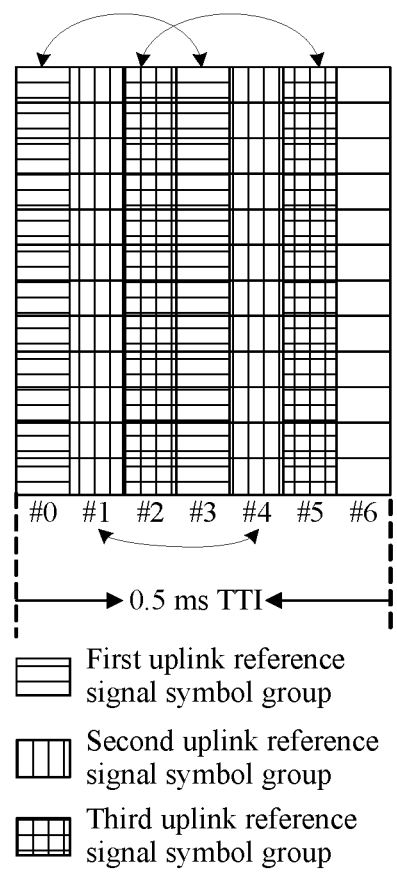
FIG. 4 is a schematic structural diagram of an uplink reference signal position in a timeslot according to Embodiment 2 of the present invention.

For example, if the uplink reference signal position includes a time unit of an uplink reference signal symbol group that is designed in a timeslot, the time unit of the at least one uplink reference signal symbol group included in the uplink reference signal position may be a time unit in a timeslot. Given a normal cyclic prefix, a timeslot may include seven symbols, and each symbol is equivalent to a time unit. FIG. 4 is a schematic structural diagram of an uplink reference signal position in a timeslot according to Embodiment 2 of the present invention. As shown in FIG. 4, in the timeslot, the uplink reference signal position may include three uplink reference signal symbol groups. A first uplink reference signal symbol group includes time units corresponding to two symbols #0 and #3. A second uplink reference signal symbol group includes time units corresponding to two symbols #1 and #4. A third uplink reference signal symbol group includes time units corresponding to two symbols #2 and #5. In the uplink reference signal position, quantities of symbols corresponding to time units in the uplink reference signal symbol groups may be different. That is, time units corresponding to the six symbols in the timeslot may also be classified into another quantity of uplink reference signal symbol groups. That is, in the timeslot, the uplink reference signal position may include another quantity of uplink reference signal symbol groups. The another quantity may be greater than 3 and less than 6. The user terminal may select one from a plurality of uplink reference signal symbol groups in the timeslot according to the indication information of the uplink reference signal symbol group corresponding to the user terminal in the second higher layer signaling or the first control information, as the uplink reference signal symbol group corresponding to the user terminal. It should be noted that FIG. 4 is merely an example of the uplink reference signal position in a timeslot. A time unit of each uplink reference signal symbol group in the at least one uplink reference signal symbol group included in the uplink reference signal position may also be distributed in another manner. Details are not further described herein.

Figure 5:
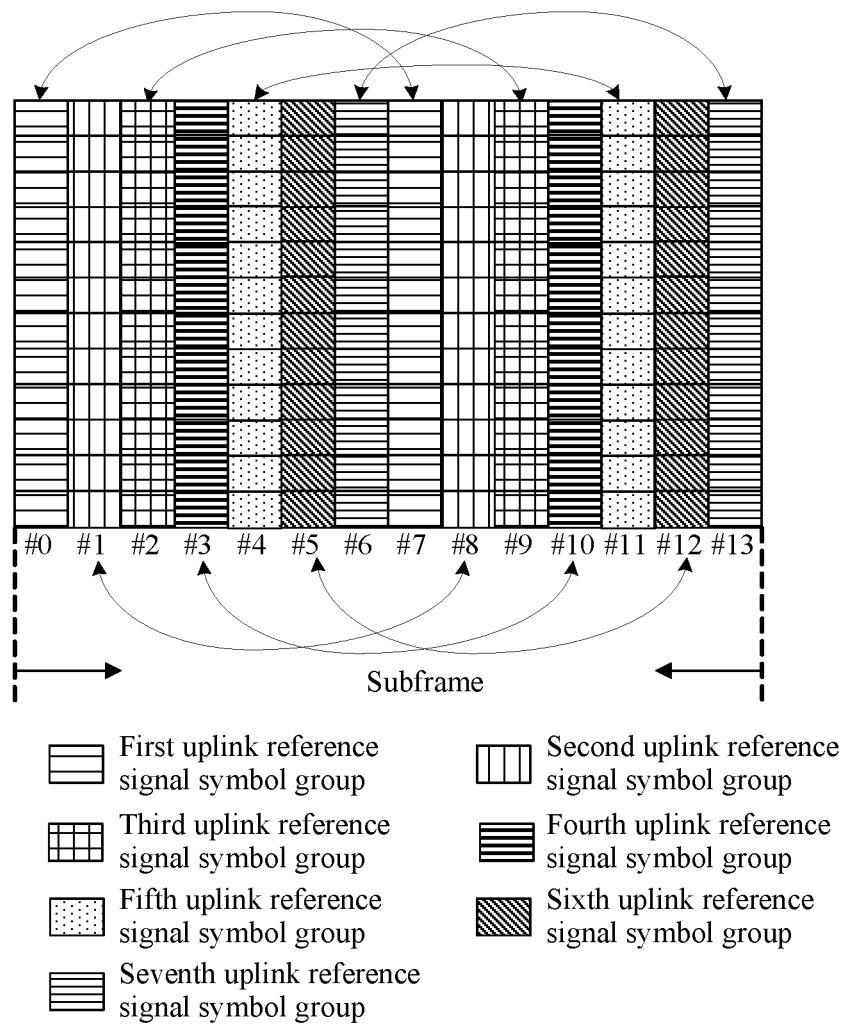
FIG. 5 is a schematic structural diagram of an uplink reference signal position in a subframe according to Embodiment 2 of the present invention.

For example, if the uplink reference signal position includes a time unit of an uplink reference signal symbol group that is designed in a subframe, the time unit of the at least one uplink reference signal symbol group included in the uplink reference signal position may be a time unit in a subframe. Given a normal cyclic prefix, a subframe may include 14 symbols, and each symbol is equivalent to a time unit. FIG. 5 is a schematic structural diagram of an uplink reference signal position in a subframe according to Embodiment 2 of the present invention. As shown in FIG. 5, in the subframe, the uplink reference signal position may include seven uplink reference signal symbol groups. A first uplink reference signal symbol group includes time units corresponding to two symbols #0 and #7. A second uplink reference signal symbol group includes time units corresponding to two symbols #1 and #8. A third uplink reference signal symbol group includes time units corresponding to two symbols #2 and #9. A fourth uplink reference signal symbol group includes time units corresponding to two symbols #3 and #10. A fifth uplink reference signal symbol group includes time units corresponding to two symbols #4 and #11. A sixth uplink reference signal symbol group includes time units corresponding to two symbols #5 and #12. A seventh uplink reference signal symbol group includes time units corresponding to two symbols #6 and #13. In the uplink reference signal position, quantities of symbols corresponding to time units in the uplink reference signal symbol groups may be different. That is, the 14 symbols in the subframe may also be classified into another quantity of uplink reference signal symbol groups. That is, in the subframe, the uplink reference signal position may include another quantity of uplink reference signal symbol groups. The another quantity may be greater than 7 and less than 14. The user terminal may select one from a plurality of uplink reference signal symbol groups in the subframe according to the indication information of the uplink reference signal symbol group corresponding to the user terminal in the second higher layer signaling or the first control information, as the uplink reference signal symbol group corresponding to the user terminal. It should be noted that FIG. 5 is merely an example of the uplink reference signal position in a subframe. A time unit of each uplink reference signal symbol group in the at least one uplink reference signal symbol group included in the uplink reference signal position may also be distributed in another manner. Details are not further described herein.

Optionally, the time unit is a time unit different from a preset time unit, and the preset time unit is a time unit of an uplink reference signal corresponding to a 1 ms TTI.

Specifically, to avoid mutual interference between the uplink reference signal sent by the user terminal and an uplink reference signal sent by a user terminal of an earlier release with a 1 ms TTI in a current cell or a neighboring cell, the time unit in each uplink reference signal symbol group may be a time unit different from the time unit of the uplink reference signal corresponding to the 1 ms TTI. In this case, the time unit of the uplink reference signal sent by the user terminal, namely, the time unit in the uplink reference signal symbol group corresponding to the user terminal and determined by the user terminal in the uplink reference signal position, is different from the time unit in which the user terminal of the 1 ms earlier release sends the uplink reference signal.

Figure 6:
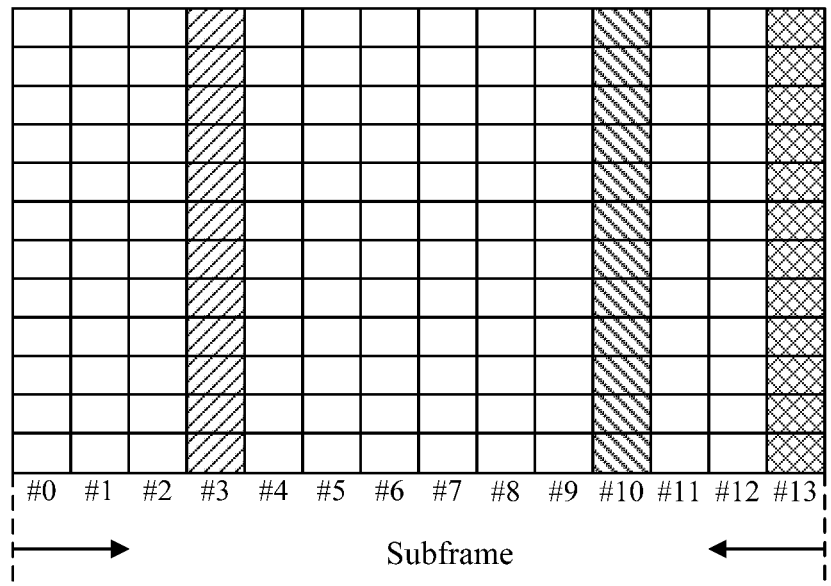
FIG. 6 is a schematic structural diagram of a time unit of an uplink reference signal symbol group that is designed in a subframe according to Embodiment 2 of the present invention.

For example, if the uplink reference signal position includes a time unit of an uplink reference signal symbol group that is designed in a subframe, the time unit of the at least one uplink reference signal symbol group included in the uplink reference signal position may be a time unit in a subframe. Given a normal cyclic prefix, a subframe includes two timeslots, and each timeslot includes seven symbols, that is, a subframe may include 14 uplink symbols, and each symbol is equivalent to a time unit. FIG. 6 is a schematic structural diagram of a time unit of an uplink reference signal symbol group that is designed in a subframe according to Embodiment 2 of the present invention. As shown in FIG. 6, the subframe may include 14 symbols #0 to #13. A sounding reference signal (SRS) in the uplink reference signal corresponding to the 1 ms TTI in the current cell or the neighboring cell may appear on the symbol #13, and a demodulation reference signal (DM-RS) in the uplink reference signal appears on the symbols #3 and #10. Therefore, given a normal cyclic prefix, to avoid mutual interference between the uplink reference signal sent by the user terminal and the uplink reference signal sent by the user terminal of the earlier release with a 1 ms TTI in the current cell or the neighboring cell, symbols corresponding to the SRS and the DM-RS in the 1 ms TTI may be eschewed. In this case, the time unit in each uplink reference signal symbol group in the uplink reference signal position may be a time unit corresponding to a symbol other than the three symbols #3, #10, and #13. That is, the time unit in each uplink reference signal symbol group may include a time unit corresponding to at least one of the symbol #0, #1, #2, #4, #5, #6, #7, #8, #9, #11, or #12. To eschew the SRS in the 1 ms TTI, the time unit in each uplink reference signal symbol group may be a time unit corresponding to a symbol other than the symbol #13, that is, the time unit in each uplink reference signal symbol group may include a time unit corresponding to at least one of the symbol #0, #1, #2, #3, #4, #5, #6, #7, #8, #9, #10, #11, or #12. To eschew only the DMRS in the 1 ms TTI, the time unit in each uplink reference signal symbol group may be a time unit corresponding to a symbol other than the symbols #3 and #10, that is, the time unit in each uplink reference signal symbol group may include a time unit corresponding to at least one of the symbol #0, #1, #2, #4, #5, #6, #7, #8, #9, #11, #12, or #13.

Figure 7:
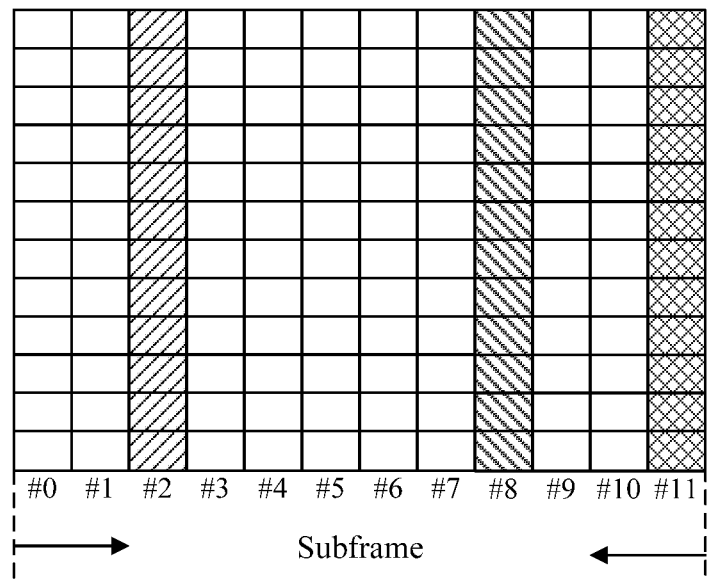
FIG. 7 is another schematic structural diagram of a time unit of an uplink reference signal symbol group that is designed in a subframe according to Embodiment 2 of the present invention.

Given an extended cyclic prefix, a subframe includes two timeslots, and each timeslot includes six symbols, that is, a subframe may include 12 uplink symbols, and each symbol is equivalent to a time unit. FIG. 7 is another schematic structural diagram of a time unit of an uplink reference signal symbol group that is designed in a subframe according to Embodiment 2 of the present invention. As shown in FIG. 7, the subframe may include 12 symbols #0 to #11. The SRS in the uplink reference signal corresponding to the user terminal of the earlier release with a 1 ms TTI in the current cell or the neighboring cell may appear on the symbol #11, and the DM-RS in the uplink reference signal appears on the symbols #2 and #8. Therefore, given an extended cyclic prefix, to avoid mutual interference between the uplink reference signal sent by the user terminal and the uplink reference signal sent by the user terminal of the earlier release with a 1 ms TTI in the current cell or the neighboring cell, symbols corresponding to the SRS and the DM-RS in the 1 ms TTI may be eschewed. In this case, the time unit in each uplink reference signal symbol group in the uplink reference signal position may be a symbol other than the three symbols #2, #8, and #11. That is, the time unit in each uplink reference signal symbol group may include a time unit corresponding to at least one of the symbol #0, #1, #3, #4, #5, #6, #7, #9, or #10. To eschew only the SRS in the 1 ms TTI, the time unit in each uplink reference signal symbol group may be a time unit corresponding to a symbol other than the symbol #11, that is, the time unit in each uplink reference signal symbol group may include a time unit corresponding to at least one of the symbol #0, #1, #2, #3, #4, #5, #6, #7, #8, #9, or #10. To eschew only the DMRS in the 1 ms TTI, the time unit in each uplink reference signal symbol group may be a time unit corresponding to a symbol other than symbols #2 and #8, that is, the time unit in each uplink reference signal symbol group may include a time unit corresponding to at least one of the symbol #0, #1, #3, #4, #5, #6, #7, #9, #10, or #11.

For example, if the uplink reference signal position includes a time unit of an uplink reference signal symbol group that is designed in a timeslot, the time unit of the at least one uplink reference signal symbol group included in the uplink reference signal position may be a time unit in a timeslot. Given a normal cyclic prefix, a timeslot includes seven symbols, and each symbol is equivalent to a time unit.

Figure 8:
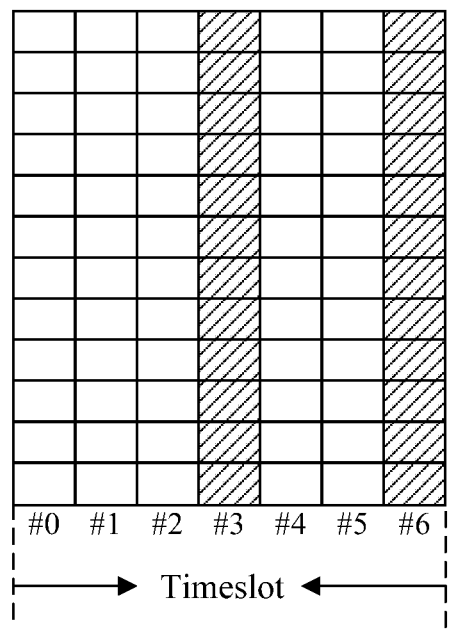
FIG. 8 is a schematic structural diagram of a time unit of an uplink reference signal symbol group that is designed in a timeslot according to Embodiment 2 of the present invention.

FIG. 8 is a schematic structural diagram of a time unit of an uplink reference signal symbol group that is designed in a timeslot according to Embodiment 2 of the present invention. As shown in FIG. 8, the timeslot includes seven symbols #0 to #6. In the timeslot, the DM-RS in the uplink reference signal corresponding to the user terminal of the earlier release with a 1 ms TTI in the current cell or the neighboring cell appears on the symbol #3, and the SRS in the uplink reference signal may appear on the symbol #6. Therefore, given a normal cyclic prefix, to avoid mutual interference between the uplink reference signal sent by the user terminal and the uplink reference signal sent by the user terminal of the earlier release with a 1 ms TTI in the current cell or the neighboring cell, symbols corresponding to the SRS and the DM-RS in the 1 ms TTI may be eschewed. In this case, the time unit in each uplink reference signal symbol group in the uplink reference signal position may be a time unit corresponding to a symbol other than the symbols #3 and #6. That is, the time unit in each uplink reference signal symbol group may include a time unit corresponding to at least one of the symbol #0, #1, #2, #4, or #5. To eschew only the SRS in the 1 ms TTI, the time unit in each uplink reference signal symbol group may be a time unit corresponding to a symbol other than the symbol #6, that is, the time unit in each uplink reference signal symbol group may include a time unit corresponding to at least one of the symbol #0, #1, #2, #3, #4, or #5. To eschew only the DMRS in the 1 ms TTI, the time unit in each uplink reference signal symbol group may be a time unit corresponding to a symbol other than the symbol #3, that is, the time unit in each uplink reference signal symbol group may include a time unit corresponding to at least one of the symbol #0, #1, #2, #4, #5, or #6.

Figure 9:
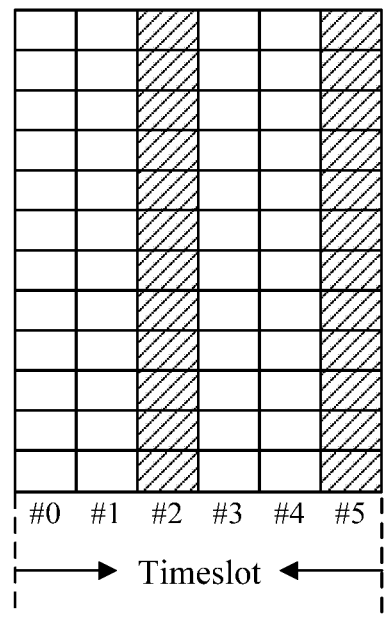
FIG. 9 is another schematic structural diagram of a time unit of an uplink reference signal symbol group that is designed in a timeslot according to Embodiment 2 of the present invention.

Given an extended cyclic prefix, a timeslot includes six symbols, and each symbol is equivalent to a time unit. FIG. 9 is another schematic structural diagram of a time unit of an uplink reference signal symbol group that is designed in a timeslot according to Embodiment 2 of the present invention. As shown in FIG. 9, the timeslot may include six symbols #0 to #5. In the timeslot, the DM-RS in the uplink reference signal corresponding to the user terminal of the earlier release with a 1 ms TTI in the current cell or the neighboring cell appears on the symbol #2, and the SRS in the uplink reference signal may appear on the symbol #5. Therefore, given an extended cyclic prefix, to avoid mutual interference between the uplink reference signal sent by the user terminal and the uplink reference signal sent by the user terminal of the earlier release with a 1 ms TTI in the current cell or the neighboring cell, symbols corresponding to the SRS and the DM-RS in the 1 ms TTI may be eschewed. In this case, the time unit in each uplink reference signal symbol group in the uplink reference signal position may be a time unit corresponding to a symbol other than the two symbols #2 and #5. That is, the time unit in each uplink reference signal symbol group may include a time unit corresponding to at least one of the symbol #0, #1, #3, or #4. To eschew only the SRS in the 1 ms TTI, the time unit in each uplink reference signal symbol group may be a time unit corresponding to a symbol other than the symbol #5, that is, the time unit in each uplink reference signal symbol group may include a time unit corresponding to at least one of the symbol #0, #1, #2, #3, or #4. To eschew only the DMRS in the 1 ms TTI, the time unit in each uplink reference signal symbol group may be a time unit corresponding to a symbol other than the symbol #2, that is, the time unit in each uplink reference signal symbol group may include a time unit corresponding to at least one of the symbol #0, #1, #3, #4, or #5.

For example, if the uplink reference signal position includes a time unit of an uplink reference signal symbol group that is designed in a timeslot, the time unit of the at least one uplink reference signal symbol group included in the uplink reference signal position may be a time unit in a timeslot. Given a normal cyclic prefix, a timeslot may include seven symbols, and each symbol corresponds to one time unit. FIG. 10 is a schematic structural diagram of an uplink reference signal position in a timeslot according to Embodiment 2 of the present invention. In the timeslot, a cyclic prefix (CP) added to a time unit corresponding to a symbol #0 is relatively long, and a channel quality of the time unit is unsuitable for performing averaging with channel quality of other time units. Time units corresponding to two symbols #3 and #6 are time units of uplink reference signals corresponding to the user terminal of the earlier release with a 1 ms TTI in the current cell or neighboring cell. Therefore, as shown in FIG. 10, the uplink reference signal position may include time units corresponding to four symbols #1, #2, #4, and #5. The four symbols may be classified into two uplink reference signal symbol groups. One of the two uplink reference signal symbol groups may include time units corresponding to the two symbols #1 and #4, and the other uplink reference signal symbol group may include time units corresponding to the two symbols #2 and #5. It should be noted that FIG. 10 is merely an example of the uplink reference signal position in a timeslot. One of the two uplink reference signal symbol groups may also include time units corresponding to the two symbols #1 and #5, and the other uplink reference signal symbol group may include time units corresponding to the two symbols #2 and #4. Alternatively, the four SC-FDMA symbols may be classified into four uplink reference signal symbol groups. The user terminal may select one from the two or four uplink reference signal symbol groups according to the indication information of the uplink reference signal symbol group corresponding to the user terminal in the second higher layer signaling or the first control information, as the uplink reference signal symbol group corresponding to the user terminal.

Alternatively, the time unit may be a time unit in a preset time interval, and the preset time interval includes a GP.

Specifically, if the preset time interval includes the GP, the preset time interval actually includes an idle time unit available for uplink transmission in the GP.

For example, if a time unit structure of an uplink reference signal symbol group is designed in a GP in a TDD communications system, given a normal cyclic prefix, in a special subframe configuration 1, the GP may include eight symbols, and each symbol is equivalent to a time unit. In the GP, because symbols #0 to #3 are relatively close to a DwPTS, and switching from downlink transmission to uplink transmission of the user terminal in the TDD communications system may not end yet, the time units in each uplink reference signal symbol group in the uplink reference signal position may include time units corresponding to symbols #4 to #7, that is, the user terminal may send the uplink reference signal in a time unit corresponding to at least one symbol included in the uplink reference signal symbol group corresponding to the user terminal, in the time units corresponding to the symbols #4 to #7.

Therefore, the uplink reference signal position may include time units corresponding to the four symbols #4, #5, #6, and #7. The time units corresponding to the four symbols may be classified into two uplink reference signal symbol groups. One of the two uplink reference signal symbol groups may include time units corresponding to the two symbols #4 and #6, and the other uplink reference signal symbol group may include time units corresponding to the two symbols #5 and #7; or one of the two uplink reference signal symbol groups may include time units corresponding to the two symbols #4 and #7, and the other uplink reference signal symbol group may include time units corresponding to the two symbols #5 and #6. Alternatively, the time units corresponding to the four symbols may be classified into four uplink reference signal symbol groups. The user terminal may select one from the two or four uplink reference signal symbol groups according to the indication information of the uplink reference signal symbol group corresponding to the user terminal in the second higher layer signaling or the first control information, as the uplink reference signal symbol group corresponding to the user terminal.

Optionally, the uplink reference signal position further includes at least one uplink reference signal subcarrier group, and each uplink reference signal subcarrier group includes at least 12 uplink subcarriers.

A codeword sequence corresponding to the uplink reference signal may include a Zadoff-Chu (ZC) sequence. A length of the ZC sequence is at least 12 codewords. Therefore, each uplink reference signal subcarrier group includes at least 12 uplink subcarriers, and each user terminal has sufficient subcarriers to transmit sufficient codewords of the ZC sequence.

Specifically, each user terminal in the plurality of user terminals may correspond to an uplink reference signal subcarrier group in the uplink reference signal position, that is, on a basis of performing time division multiplexing according to the uplink reference signal symbol groups corresponding to the user terminals, frequency division multiplexing may be further performed on uplink reference signals of different user terminals in the plurality of user terminals by using the uplink reference signal subcarrier groups corresponding to the user terminals, and code division multiplexing may be further performed by using uplink reference signal codewords corresponding to the user terminals. Therefore, when time domain resources are definite, in the solution of this embodiment of the present invention, frequency division multiplexing may be further performed on the uplink reference signals corresponding to the different user terminals. Optionally, when time-frequency resources are definite, in the solution of this embodiment of the present invention, on a basis of performing time division multiplexing and frequency division multiplexing on the uplink reference signals corresponding to the different user terminals, code division multiplexing may be further performed on the uplink reference signals. Therefore, a quantity of user terminals supported by the base station can be increased, and a system capacity can be increased.

FIG. 11 is a flowchart of an uplink reference signal transmission method according to Embodiment 2 of the present invention. As shown in FIG. 11, optionally, that the user terminal sends an uplink reference signal in a time unit of the uplink reference signal symbol group corresponding to the user terminal in S303 may include:

S1101. The user terminal determines, in the uplink reference signal position according to the second higher layer signaling or the first control information, the uplink reference signal symbol group corresponding to the user terminal and an uplink reference signal subcarrier group corresponding to the user terminal, where the second higher layer signaling or the first control information further includes indication information of the uplink reference signal subcarrier group corresponding to the user terminal.

Specifically, the user terminal may determine, from the at least one uplink reference signal symbol group in the uplink reference signal position according to the indication information of the uplink reference signal symbol group corresponding to the user terminal in the second higher layer signaling or the first control information, the uplink reference signal symbol group corresponding to the user terminal, and determine, from the at least one uplink reference signal subcarrier group according to the indication information of the uplink reference signal subcarrier group corresponding to the user terminal, the uplink reference signal subcarrier group corresponding to the user terminal.

Optionally, that the user terminal sends an uplink reference signal in a time unit of the uplink reference signal symbol group corresponding to the user terminal in S303 includes:

S1102. The user terminal sends the uplink reference signal in the time unit of the uplink reference signal symbol group corresponding to the user terminal in a time domain and a subcarrier of the uplink signal subcarrier group corresponding to the user terminal in a frequency domain.

Optionally, a frequency spacing of at least one subcarrier exists between every two subcarriers in the at least 12 subcarriers.

Specifically, if the uplink reference signal subcarrier group corresponding to the user terminal includes at least 12 uplink subcarriers, the user terminal sends the uplink reference signal in the at least 12 uplink subcarriers in which a frequency spacing of at least one uplink subcarrier exists between every two uplink subcarriers. In this way, different user terminals may perform sending in comb-like subcarrier positions. Therefore, subcarriers in uplink reference signal subcarrier groups corresponding to different user terminals are more discrete, and it is convenient for the base station to perform channel sounding in a wider frequency domain by using uplink reference signals in limited subcarriers.

Figure 12:
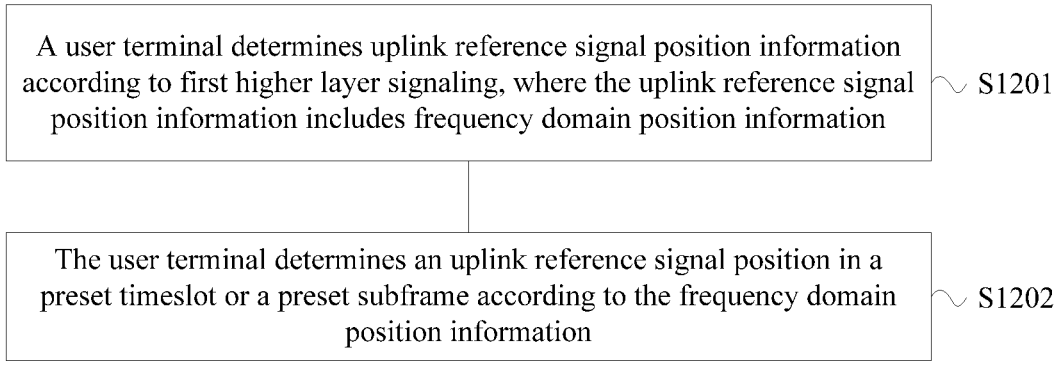
FIG. 12 is a flowchart of a method for determining an uplink reference signal position in an uplink reference signal transmission method according to Embodiment 2 of the present invention.

FIG. 12 is a flowchart of a method for determining an uplink reference signal position in an uplink reference signal transmission method according to Embodiment 2 of the present invention. As shown in FIG. 12, optionally, that a user terminal determines an uplink reference signal position according to first higher layer signaling in S301 may include the following steps.

S1201. The user terminal determines uplink reference signal position information according to the first higher layer signaling, where the uplink reference signal position information includes frequency domain position information.

Specifically, the frequency domain position information may include a physical resource block (PRB) index, a resource block group (RBG) index, a virtual resource block (VRB) index, a subcarrier index, or a subcarrier group index.

A PRB and a VRB are different resource allocation units. The PRB includes 12 consecutive subcarriers in the frequency domain and resources of one timeslot in the time domain. In localized resource allocation, definitions of the VRB and the PRB are the same. In distributed resource allocation, a correspondence exists between the VRB and the PRB. The PRB index is an index of a PRB. The VRB index is an index of a VRB. Therefore, the PRB index may be different from the VRB index. An RBG may include a plurality of PRBs, that is, a quantity of PRBs included in the RBG may be determined according to bandwidth of the user terminal or configured by the base station. The PRB index may be a PRB number. The RBG index may be an RBG number. The VRB index may be a VRB number. The subcarrier index may be a subcarrier number. The subcarrier group index may be a subcarrier group number. A subcarrier group may include at least one subcarrier.

S1202. The user terminal determines the uplink reference signal position in a preset timeslot or a preset subframe according to the frequency domain position information.

A frequency domain resource corresponding to the frequency domain position information is within bandwidth of a carrier of the base station. That is, in this embodiment of the present invention, a time domain position of the at least one uplink reference signal symbol group in the uplink reference signal position may be in the preset timeslot or the preset subframe, and a frequency domain position thereof is a position indicated by the frequency domain position information.

Figure 13:
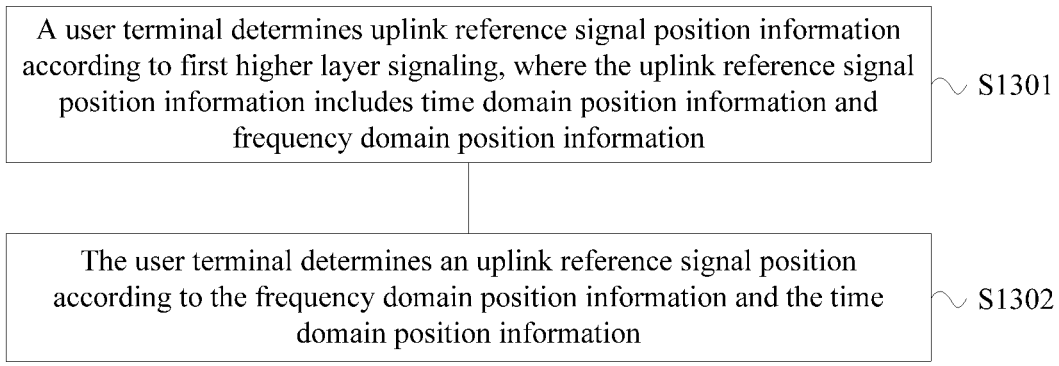
FIG. 13 is a flowchart of another method for determining an uplink reference signal position in an uplink reference signal transmission method according to Embodiment 2 of the present invention.

Alternatively, Embodiment 2 of the present invention further provides another method for determining an uplink reference signal position. FIG. 13 is a flowchart of another method for determining an uplink reference signal position in an uplink reference signal transmission method according to Embodiment 2 of the present invention. As shown in FIG. 13, that a user terminal determines an uplink reference signal position according to first higher layer signaling in S301 may include the following steps.

S1301. The user terminal determines uplink reference signal position information according to the first higher layer signaling, where the uplink reference signal position information includes time domain position information and frequency domain position information.

The time domain position information may include a symbol index, a symbol group index, a timeslot index, or a subframe index. A symbol may be an OFDMA symbol or an SC-FDMA symbol in an LTE communications system with a 15 kHz subcarrier spacing, or a symbol in a communications system with a greater subcarrier spacing. A timeslot may be a timeslot of a 0.5 ms length in an LTE communications system with a 15 kHz subcarrier spacing, or a timeslot in a communications system with a greater subcarrier spacing, for example, a timeslot of a 0.125 ms length in a communications system with a 60 kHz subcarrier spacing. A subframe may be a 1 ms subframe in an LTE system with a 15 kHz subcarrier spacing, or a subframe in a communications system with a greater subcarrier spacing, for example, a subframe of a 0.25 ms length in a communications system with a 60 kHz subcarrier spacing.

S1302. The user terminal determines the uplink reference signal position according to the frequency domain position information and the time domain position information.

That is, a time domain position of the at least one uplink reference signal symbol group in the uplink reference signal position may be a time domain position indicated by the time domain position information, and a frequency domain position thereof may be a frequency domain position indicated by the frequency domain position information.

Figure 14:
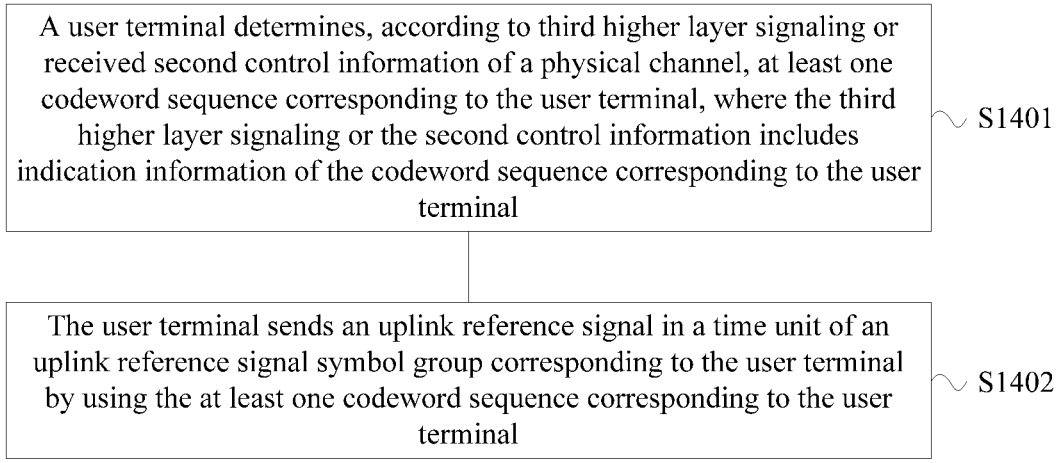
FIG. 14 is a flowchart of an uplink reference signal transmission method according to Embodiment 2 of the present invention.

Optionally, Embodiment 2 of the present invention further provides a method for determining an uplink reference signal. FIG. 14 is a flowchart of an uplink reference signal transmission method according to Embodiment 2 of the present invention. As shown in FIG. 14, optionally, before the user terminal sends the uplink reference signal in the time unit of the uplink reference signal symbol group corresponding to the user terminal in S303 in Embodiment 1, the method may further include the following steps.

S1401. The user terminal determines, according to third higher layer signaling or received second control information of the physical channel, at least one codeword sequence corresponding to the user terminal, where the third higher layer signaling or the second control information includes indication information of the codeword sequence corresponding to the user terminal.

Correspondingly, that the user terminal sends an uplink reference signal in a time unit of the uplink reference signal symbol group corresponding to the user terminal in S303 may include:

S1402. The user terminal sends the uplink reference signal in the time unit of the uplink reference signal symbol group corresponding to the user terminal by using the at least one codeword sequence corresponding to the user terminal.

Specifically, the at least one codeword sequence corresponding to the user terminal may be a pseudo-random sequence or an orthogonal sequence, for example, a ZC sequence. The user terminal may send the uplink reference signal by using the at least one codeword sequence corresponding to the user terminal.

Optionally, the time unit may be a time unit corresponding to an SC-FDMA symbol, or a time unit corresponding to an OFDMA symbol.

Optionally, the uplink reference signal in each embodiment of the present invention may include a DMRS and/or an SRS.

In each uplink reference signal transmission method provided by Embodiment 2 of the present invention, a time interval is set between every two time units in a plurality of time units in each uplink reference signal symbol group, so that each user terminal can send an uplink reference signal in non-consecutive time units in the plurality of time units. This ensures that a result of frequency offset estimation performed by the base station for the user terminal is more accurate. In addition, in the method in Embodiment 2 of the present invention, because the time unit is a time unit different from a preset time unit, mutual interference between the uplink reference signal sent by the user terminal and the uplink reference signal sent by the user terminal of the earlier release with a 1 ms TTI in the current cell or the neighboring cell can be further avoided. The time unit may also be a time unit in at least one time interval in the GP, so that a time unit in a special subframe can be fully used. This reduces a time unit of an uplink reference signal in an uplink subframe, ensures uplink data transmission, and improves data transmission efficiency.

Embodiment 3 of the present invention further provides an uplink reference signal transmission method. FIG. 15 is a flowchart of the uplink reference signal transmission method according to Embodiment 3 of the present invention. As shown in FIG. 15, the method may include the following steps.

S1501. A base station sends first higher layer signaling to a user terminal, where the first higher layer signaling is used by the user terminal to determine an uplink reference signal position, the uplink reference signal position includes at least one uplink reference signal symbol group, and each uplink reference signal symbol group includes at least one time unit.

S1502. The base station sends second higher layer signaling to the user terminal, or sends first control information to the user terminal by using a physical channel, where the second higher layer signaling or the first control information includes indication information of an uplink reference signal symbol group corresponding to the user terminal, and the indication information of the uplink reference signal symbol group corresponding to the user terminal is used to instruct the user terminal to determine, in the uplink reference signal position, the uplink reference signal symbol group corresponding to the user terminal.

S1503. The base station receives an uplink reference signal sent by the user terminal in a time unit of the uplink reference signal symbol group corresponding to the user terminal.

Optionally, if each uplink reference signal symbol group includes a plurality of time units, a time interval of at least one symbol exists between every two time units in the plurality of time units.

Optionally, the time unit is a time unit different from a preset time unit, and the preset time unit is a time unit of an uplink reference signal corresponding to a 1 ms TTI.

Optionally, the time unit is a time unit in a preset time interval, and the preset time interval includes a GP.

Optionally, the uplink reference signal position includes at least one uplink reference signal subcarrier group, and each uplink reference signal subcarrier group includes at least 12 uplink subcarriers;

the second higher layer signaling or the first control information further includes indication information of an uplink reference signal subcarrier group corresponding to the user terminal, and the indication information of the uplink reference signal subcarrier group corresponding to the user terminal is used to instruct the user terminal to determine, in the uplink reference signal position, the uplink reference signal subcarrier group corresponding to the user terminal; and that the base station receives an uplink reference signal sent by the user terminal in a time unit of the uplink reference signal symbol group corresponding to the user terminal in S1503 may include:

the base station receives the uplink reference signal sent by the user terminal in the time unit of the uplink reference signal symbol group corresponding to the user terminal in a time domain and a subcarrier of the uplink signal subcarrier group corresponding to the user terminal in a frequency domain.

Optionally, if each uplink reference signal subcarrier group includes at least 12 uplink subcarriers, a frequency spacing of at least one subcarrier exists between every two subcarriers in the at least 12 subcarriers.

Optionally, the first higher layer signaling includes uplink reference signal position information, where the uplink reference signal position information includes frequency domain position information; and the frequency domain position information is used by the user terminal to determine the uplink reference signal position in a preset timeslot or subframe.

Alternatively, the first higher layer signaling includes uplink reference signal position information, where the uplink reference signal position information includes time domain position information and frequency domain position information; and the time domain position information and the frequency domain position information are used by the user terminal to determine the uplink reference signal position.

Optionally, the method further includes:

the base station sends the uplink reference signal position information to another base station by using an X2 interface, where the uplink reference signal position information is used to make an uplink reference signal position of the another base station different from the uplink reference signal position of the base station.

Optionally, before the base station receives the uplink reference signal sent by the user terminal in the time unit of the uplink reference signal symbol group corresponding to the user terminal in S1503, the method further includes:

the base station sends third higher layer signaling to the user terminal, or sends second control information to the user terminal by using the physical channel, where the third higher layer signaling or the second control information includes indication information of a codeword sequence corresponding to the user terminal, and the indication information of the codeword sequence corresponding to the user terminal is used to instruct the user terminal to determine at least one codeword sequence corresponding to the user terminal; and correspondingly, that the base station receives an uplink reference signal sent by the user terminal in a time unit of the uplink reference signal symbol group corresponding to the user terminal in S1503 includes:

the base station receives the uplink reference signal sent by the user terminal in the time unit of the uplink reference signal symbol group corresponding to the user terminal by using the at least one codeword sequence corresponding to the user terminal.

Optionally, the time unit is a time unit corresponding to an SC-FDMA symbol, or a time unit corresponding to an OFDMA symbol.

Optionally, the uplink reference signal may include a DMRS and/or an SRS.

The uplink reference signal transmission method in Embodiment 3 of the present invention is a transmission method corresponding to the uplink reference signal transmission method in Embodiment 1 or 2. A beneficial effect of the method is similar to that of the foregoing embodiment. Details are not further described herein.

Embodiment 4 of the present invention further provides an uplink reference signal transmission method. Assuming that a cell of a base station includes a first user terminal and a second user terminal, FIG. 16A and FIG. 16B are a flowchart of the uplink reference signal transmission method according to Embodiment 4 of the present invention. As shown in FIG. 16A and FIG. 16B, the method may include the following steps.

S1601. The base station sends first uplink reference signal position information to the first user terminal, where the first uplink reference signal position information includes first time domain position information and first frequency domain position information.

The base station may send the first uplink reference signal position information to the first user terminal by using higher layer signaling.

S1602. The base station sends second uplink reference signal position information to the second user terminal, where the second uplink reference signal position information includes second time domain position information and second frequency domain position information.

The base station may also send the second uplink reference signal position information to the second user terminal by using higher layer signaling. The higher layer signaling for sending the first uplink reference signal position information by the base station and the higher layer signaling for sending the second uplink reference signal position information by the base station may be the same or may be different.

S1603. The base station sends, to the first user terminal by using a physical channel, indication information of an uplink reference signal symbol group corresponding to the first user terminal and indication information of an uplink reference signal subcarrier group corresponding to the first user terminal.

The physical channel may be any downlink physical channel such as a PDCCH or an EPDCCH.

S1604. The base station sends, to the second user terminal by using a physical channel, indication information of an uplink reference signal symbol group corresponding to the second user terminal and indication information of an uplink reference signal subcarrier group corresponding to the second user terminal.

The physical channel for sending the indication information of the uplink reference signal symbol group corresponding to the first user terminal and the indication information of the uplink reference signal subcarrier group corresponding to the first user terminal by the base station may be the same as or may be different from the physical channel for sending the indication information of the uplink reference signal symbol group corresponding to the second user terminal and the indication information of the uplink reference signal subcarrier group corresponding to the second user terminal.

S1605. The base station sends the first uplink reference signal position information and the second uplink reference signal position information to another base station by using an X2 interface, where the first uplink reference signal position information and the second uplink reference signal position information are used to make an uplink reference signal position of the another base station different from the uplink reference signal positions of the base station.

The uplink reference signal positions of the base station may include a first uplink reference signal position and a second uplink reference signal position.

S1606. The first user terminal determines a first uplink reference signal position according to the first time domain position information and the first frequency domain position information, and determines, in the first uplink reference signal position according to the indication information of the uplink reference signal symbol group corresponding to the first user terminal and the indication information of the uplink reference signal subcarrier group corresponding to the first user terminal, the uplink reference signal symbol group corresponding to the first user terminal and the uplink reference signal subcarrier group corresponding to the first user terminal.

S1607. The base station sends indication information of a first codeword sequence to the first user terminal.

The base station may send the indication information of the first codeword sequence to the first user terminal by using higher layer signaling or a physical channel.

S1608. The first user terminal determines, according to the indication information of the first codeword sequence, the first codeword sequence corresponding to the first user terminal, and sends an uplink reference signal of the first user terminal to the base station in a time unit of the uplink reference signal symbol group corresponding to the first user terminal in a time domain and a subcarrier of the uplink reference signal subcarrier group corresponding to the first user terminal in a frequency domain by using the first codeword sequence.

S1609. The second user terminal determines a second uplink reference signal position according to the second time domain position information and the second frequency domain position information, and determines, in the second uplink reference signal position according to the indication information of the uplink reference signal symbol group corresponding to the second user terminal and the indication information of the uplink reference signal subcarrier group corresponding to the second user terminal, the uplink reference signal symbol group corresponding to the second user terminal and the uplink reference signal subcarrier group corresponding to the second user terminal.

The second uplink reference signal position determined by the second user terminal and the first uplink reference signal position determined by the first user terminal may be the same or may be different. The uplink reference signal symbol group corresponding to the second user terminal and determined by the second user terminal and the uplink reference signal symbol group corresponding to the first user terminal and determined by the first user terminal may be the same or may be different. The uplink reference signal subcarrier group corresponding to the second user terminal and determined by the second user terminal and the uplink reference signal subcarrier group corresponding to the first user terminal and determined by the first user terminal may be the same or may be different.

S1610. The base station sends indication information of a second codeword sequence to the second user terminal.

The base station may send the indication information of the second codeword sequence to the second user terminal by using higher layer signaling or a physical channel. The base station may send the indication information of the first codeword sequence and the indication information of the second codeword sequence by using the same or different higher layer signaling, or may send the indication information of the first codeword sequence and the indication information of the second codeword sequence by using the same or different physical channels. The base station may also send the indication information of the first codeword sequence by using higher layer signaling, and send the indication information of the second codeword sequence by using a physical channel. Conversely, the base station may also send the indication information of the second codeword sequence by using higher layer signaling, and send the indication information of the first codeword sequence by using a physical channel.

S1611. The second user terminal determines, according to the indication information of the second codeword sequence, the second codeword sequence of the second user terminal, and sends an uplink reference signal of the second user terminal to the base station in a time unit of the uplink reference signal symbol group corresponding to the second user terminal in the time domain and a subcarrier of the uplink reference signal subcarrier group corresponding to the second user terminal in the frequency domain by using the second codeword sequence.

S1612. The base station receives, in the uplink reference signal symbol group corresponding to the first user terminal in the time domain and the uplink reference signal subcarrier group corresponding to the first user terminal in the frequency domain, the uplink reference signal of the first user terminal that is sent by the first user terminal by using the first codeword sequence, and receives, in the time unit of the uplink reference signal symbol group corresponding to the second user terminal in the time domain and the subcarrier of the uplink reference signal subcarrier group corresponding to the second user terminal in the frequency domain, the uplink reference signal of the second user terminal that is sent by the second user terminal by using the second codeword sequence.

The uplink reference signal transmission method in Embodiment 4 of the present invention is described in the foregoing embodiment by using a specific example. A beneficial effect of the method is similar to that of the foregoing embodiment. Details are not further described herein.

Figure 17:
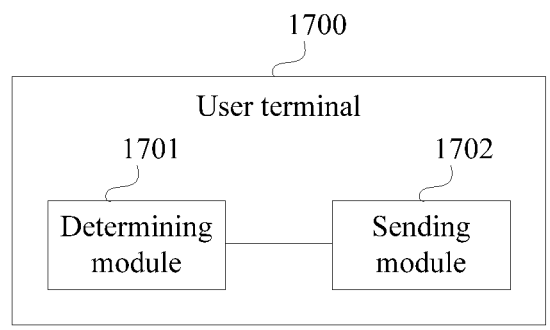
FIG. 17 is a schematic structural diagram of a user terminal according to Embodiment 5 of the present invention.

Embodiment 5 of the present invention further provides a user terminal. The user terminal provided by this embodiment may be configured to perform the uplink reference signal transmission method in Embodiment 1 or Embodiment 2. FIG. 17 is a schematic structural diagram of the user terminal according to Embodiment 5 of the present invention. As shown in FIG. 17, the user terminal 1700 may include a determining module 1701 and a sending module 1702.

The determining module 1701 is configured to determine an uplink reference signal position according to first higher layer signaling, where the uplink reference signal position includes at least one uplink reference signal symbol group, and each uplink reference signal symbol group includes at least one time unit; and determine, in the uplink reference signal position according to second higher layer signaling or received first control information of a physical channel, an uplink reference signal symbol group corresponding to the user terminal, where the second higher layer signaling or the first control information includes indication information of the uplink reference signal symbol group corresponding to the user terminal.

The sending module 1702 is configured to send an uplink reference signal in a time unit of the uplink reference signal symbol group corresponding to the user terminal.

Optionally, if each uplink reference signal symbol group includes a plurality of time units, a time interval of at least one time unit exists between every two time units in the plurality of time units.

Optionally, the time unit is a time unit different from a preset time unit, and the preset time unit is a time unit of an uplink reference signal corresponding to a 1 ms TTI.

Optionally, the time unit includes a time unit in a preset time interval, and the preset time interval includes a guard period.

Optionally, the uplink reference signal position further includes at least one uplink reference signal subcarrier group, and each uplink reference signal subcarrier group includes at least 12 uplink subcarriers;

the determining module 1701 is further configured to determine, in the uplink reference signal position according to the second higher layer signaling or the first control information, the uplink reference signal symbol group corresponding to the user terminal and an uplink reference signal subcarrier group corresponding to the user terminal, where the second higher layer signaling or the first control information further includes indication information of the uplink reference signal subcarrier group corresponding to the user terminal; and the sending module 1702 is specifically configured to send the uplink reference signal in the time unit of the uplink reference signal symbol group corresponding to the user terminal in a time domain and a subcarrier of the uplink signal subcarrier group corresponding to the user terminal in a frequency domain.

Optionally, a frequency spacing of at least one subcarrier exists between every two subcarriers in the at least 12 uplink subcarriers.

Optionally, the determining module 1701 is further configured to determine uplink reference signal position information according to the first higher layer signaling, where the uplink reference signal position information includes frequency domain position information; and determine the uplink reference signal position in a preset timeslot or subframe according to the frequency domain position information.

Optionally, the determining module 1701 is further configured to determine uplink reference signal position information according to the first higher layer signaling, where the uplink reference signal position information includes time domain position information and frequency domain position information; and determine the uplink reference signal position according to the frequency domain position information and the time domain position information.

Optionally, the determining module 1701 is further configured to determine, according to third higher layer signaling or received second control information of the physical channel, at least one codeword sequence corresponding to the user terminal, where the third higher layer signaling or the second control information includes indication information of the codeword sequence corresponding to the user terminal; and the sending module 1702 is specifically configured to send the uplink reference signal in the time unit of the uplink reference signal symbol group corresponding to the user terminal by using the at least one codeword sequence corresponding to the user terminal.

Optionally, the time unit is a time unit corresponding to an SC-FDMA symbol, or a time unit corresponding to an OFDMA symbol.

The user terminal provided by Embodiment 5 of the present invention can perform the uplink reference signal transmission method in Embodiment 1 or Embodiment 2. For a beneficial effect and an implementation process of the user terminal, refer to the descriptions in the foregoing embodiment. Details are not further described herein.

Figure 18:
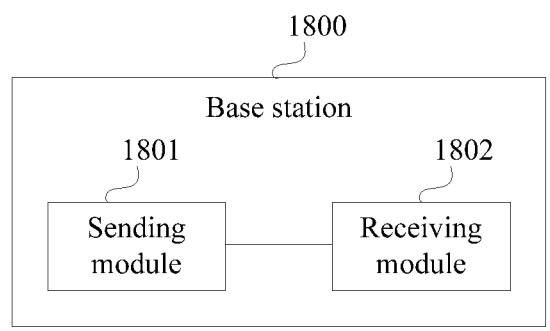
FIG. 18 is a schematic structural diagram of a base station according to Embodiment 6 of the present invention.

Embodiment 6 of the present invention further provides a base station. The base station in Embodiment 6 can perform the uplink reference signal transmission method in Embodiment 3. FIG. 18 is a schematic structural diagram of the base station according to Embodiment 6 of the present invention. As shown in FIG. 18, the base station 1800 includes a sending module 1801 and a receiving module 1802.

The sending module 1801 is configured to send first higher layer signaling to a user terminal, and send second higher layer signaling to the user terminal or send first control information to the user terminal by using a physical channel, where the first higher layer signaling is used by the user terminal to determine an uplink reference signal position, the uplink reference signal position includes at least one uplink reference signal symbol group, and each uplink reference signal symbol group includes at least one time unit; the second higher layer signaling or the first control information includes indication information of an uplink reference signal symbol group corresponding to the user terminal, and the indication information of the uplink reference signal symbol group corresponding to the user terminal is used to instruct the user terminal to determine, in the uplink reference signal position, the uplink reference signal symbol group corresponding to the user terminal.

The receiving module 1802 is configured to receive an uplink reference signal sent by the user terminal in a time unit of the uplink reference signal symbol group corresponding to the user terminal.

Optionally, if each uplink reference signal symbol group includes a plurality of time units, a time interval of at least one symbol exists between every two time units in the plurality of time units.

Optionally, the time unit is a time unit different from a preset time unit, and the preset time unit is a time unit of an uplink reference signal corresponding to a 1 ms TTI.

Optionally, the time unit is a time unit in a preset time interval, and the preset time interval includes a GP.

Optionally, the uplink reference signal position further includes at least one uplink reference signal subcarrier group, and each uplink reference signal subcarrier group includes at least 12 uplink subcarriers;

the second higher layer signaling or the first control information further includes indication information of an uplink reference signal subcarrier group corresponding to the user terminal, and the indication information of the uplink reference signal subcarrier group corresponding to the user terminal is used to instruct the user terminal to determine, in the uplink reference signal position, the uplink reference signal subcarrier group corresponding to the user terminal; and the receiving module 1802 is specifically configured to receive the uplink reference signal sent by the user terminal in the time unit of the uplink reference signal symbol group corresponding to the user terminal in a time domain and a subcarrier of the uplink signal subcarrier group corresponding to the user terminal in a frequency domain.

Optionally, a frequency spacing of at least one subcarrier exists between every two subcarriers in the at least 12 subcarriers.

Optionally, the first higher layer signaling includes uplink reference signal position information, where the uplink reference signal position information includes frequency domain position information; and the frequency domain position information is used by the user terminal to determine the uplink reference signal position in a preset timeslot or subframe.

Optionally, the first higher layer signaling includes uplink reference signal position information, where the uplink reference signal position information includes time domain position information and frequency domain position information; and the time domain position information and the frequency domain position information are used by the user terminal to determine the uplink reference signal position.

Optionally, the sending module 1801 is specifically configured to send the uplink reference signal position information to another base station by using an X2 interface, where the uplink reference signal position information is used to make an uplink reference signal position of the another base station different from the uplink reference signal position of the base station.

Optionally, the sending module 1801 is further configured to send third higher layer signaling to the user terminal, or send second control information to the user terminal by using the physical channel, where the third higher layer signaling or the second control information includes indication information of a codeword sequence corresponding to the user terminal, and the indication information of the codeword sequence corresponding to the user terminal is used to instruct the user terminal to determine at least one codeword sequence corresponding to the user terminal; and the receiving module 1802 is specifically configured to receive the uplink reference signal sent by the user terminal in the time unit of the uplink reference signal symbol group corresponding to the user terminal by using the at least one codeword sequence corresponding to the user terminal.

Optionally, the time unit is a time unit corresponding to an SC-FDMA symbol, or a time unit corresponding to an OFDMA symbol.

The base station provided by Embodiment 6 of the present invention can perform the uplink reference signal transmission method in Embodiment 3. For a beneficial effect and an implementation process of the base station, refer to the descriptions in the foregoing embodiment. Details are not further described herein.

Figure 19:
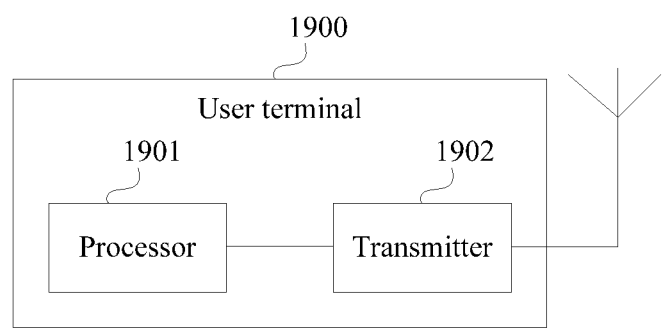
FIG. 19 is a schematic structural diagram of a user terminal according to Embodiment 7 of the present invention.

Embodiment 7 of the present invention further provides a user terminal. FIG. 19 is a schematic structural diagram of the user terminal according to Embodiment 7 of the present invention. As shown in FIG. 19, the user terminal 1900 may include a processor 1901 and a transmitter 1902.

The processor 1901 is configured to determine an uplink reference signal position according to first higher layer signaling, where the uplink reference signal position includes at least one uplink reference signal symbol group, and each uplink reference signal symbol group includes at least one time unit; and determine, in the uplink reference signal position according to second higher layer signaling or received first control information of a physical channel, an uplink reference signal symbol group corresponding to the user terminal, where the second higher layer signaling or the first control information includes indication information of the uplink reference signal symbol group corresponding to the user terminal.

The transmitter 1902 is configured to send an uplink reference signal in a time unit of the uplink reference signal symbol group corresponding to the user terminal.

Optionally, if each uplink reference signal symbol group includes a plurality of time units, a time interval of at least one time unit exists between every two time units in the plurality of time units.

Optionally, the time unit is a time unit different from a preset time unit, and the preset time unit is a time unit of an uplink reference signal corresponding to a 1 ms TTI.

Optionally, the time unit includes a time unit in a preset time interval, and the preset time interval includes a guard period.

Optionally, the uplink reference signal position further includes at least one uplink reference signal subcarrier group, and each uplink reference signal subcarrier group includes at least 12 uplink subcarriers;

the processor 1901 is further configured to determine, in the uplink reference signal position according to the second higher layer signaling or the first control information, the uplink reference signal symbol group corresponding to the user terminal and an uplink reference signal subcarrier group corresponding to the user terminal, where the second higher layer signaling or the first control information further includes indication information of the uplink reference signal subcarrier group corresponding to the user terminal; and the transmitter 1902 is specifically configured to send the uplink reference signal in the time unit of the uplink reference signal symbol group corresponding to the user terminal in a time domain and a subcarrier of the uplink signal subcarrier group corresponding to the user terminal in a frequency domain.

Optionally, a frequency spacing of at least one subcarrier exists between every two subcarriers in the at least 12 uplink subcarriers.

Optionally, the processor 1901 is further configured to determine uplink reference signal position information according to the first higher layer signaling, where the uplink reference signal position information includes frequency domain position information; and determine the uplink reference signal position in a preset timeslot or subframe according to the frequency domain position information.

Optionally, the processor 1901 is further configured to determine uplink reference signal position information according to the first higher layer signaling, where the uplink reference signal position information includes time domain position information and frequency domain position information; and determine the uplink reference signal position according to the frequency domain position information and the time domain position information.

Optionally, the processor 1901 is further configured to determine, according to third higher layer signaling or received second control information of the physical channel, at least one codeword sequence corresponding to the user terminal, where the third higher layer signaling or the second control information includes indication information of the codeword sequence corresponding to the user terminal; and the transmitter 1902 is specifically configured to send the uplink reference signal in the time unit of the uplink reference signal symbol group corresponding to the user terminal by using the at least one codeword sequence corresponding to the user terminal.

Optionally, the time unit is a time unit corresponding to an SC-FDMA symbol, or a time unit corresponding to an OFDMA symbol.

The user terminal provided by Embodiment 7 of the present invention can perform the uplink reference signal transmission method in Embodiment 1 or Embodiment 2. For a beneficial effect and an implementation process of the user terminal, refer to the descriptions in the foregoing embodiment. Details are not further described herein.

Figure 20:
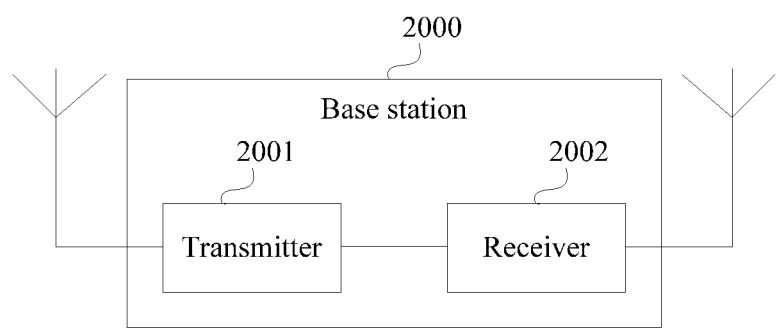
FIG. 20 is a schematic structural diagram of a base station according to Embodiment 8 of the present invention.

Embodiment 8 of the present invention further provides a base station. FIG. 20 is a schematic structural diagram of the base station according to Embodiment 8 of the present invention. As shown in FIG. 20, the base station 2000 includes a transmitter 2001 and a receiver 2002.

The transmitter 2001 is configured to send first higher layer signaling to a user terminal, and send second higher layer signaling to the user terminal or send first control information to the user terminal by using a physical channel, where the first higher layer signaling is used by the user terminal to determine an uplink reference signal position, the uplink reference signal position includes at least one uplink reference signal symbol group, and each uplink reference signal symbol group includes at least one time unit; the second higher layer signaling or the first control information includes indication information of an uplink reference signal symbol group corresponding to the user terminal, and the indication information of the uplink reference signal symbol group corresponding to the user terminal is used to instruct the user terminal to determine, in the uplink reference signal position, the uplink reference signal symbol group corresponding to the user terminal.

The receiver 2002 is configured to receive an uplink reference signal sent by the user terminal in a time unit of the uplink reference signal symbol group corresponding to the user terminal.

Optionally, if each uplink reference signal symbol group includes a plurality of time units, a time interval of at least one symbol exists between every two time units in the plurality of time units.

Optionally, the time unit is a time unit different from a preset time unit, and the preset time unit is a time unit of an uplink reference signal corresponding to a 1 ms TTI.

Optionally, the time unit is a time unit in a preset time interval, and the preset time interval includes a GP.

Optionally, the uplink reference signal position further includes at least one uplink reference signal subcarrier group, and each uplink reference signal subcarrier group includes at least 12 uplink subcarriers;

the second higher layer signaling or the first control information further includes indication information of an uplink reference signal subcarrier group corresponding to the user terminal, and the indication information of the uplink reference signal subcarrier group corresponding to the user terminal is used to instruct the user terminal to determine, in the uplink reference signal position, the uplink reference signal subcarrier group corresponding to the user terminal; and the receiver 2002 is specifically configured to receive the uplink reference signal sent by the user terminal in the time unit of the uplink reference signal symbol group corresponding to the user terminal in a time domain and a subcarrier of the uplink signal subcarrier group corresponding to the user terminal in a frequency domain.

Optionally, a frequency spacing of at least one subcarrier exists between every two subcarriers in the at least 12 subcarriers.

Optionally, the first higher layer signaling includes uplink reference signal position information, where the uplink reference signal position information includes frequency domain position information; and the frequency domain position information is used by the user terminal to determine the uplink reference signal position in a preset timeslot or subframe.

Optionally, the first higher layer signaling includes uplink reference signal position information, where the uplink reference signal position information includes time domain position information and frequency domain position information; and the time domain position information and the frequency domain position information are used by the user terminal to determine the uplink reference signal position.

Optionally, the transmitter 2001 is specifically configured to send the uplink reference signal position information to another base station by using an X2 interface, where the uplink reference signal position information is used to make an uplink reference signal position of the another base station different from the uplink reference signal position of the base station.

Optionally, the transmitter 2001 is further configured to send third higher layer signaling to the user terminal, or send second control information to the user terminal by using the physical channel, where the third higher layer signaling or the second control information includes indication information of a codeword sequence corresponding to the user terminal, and the indication information of the codeword sequence corresponding to the user terminal is used to instruct the user terminal to determine at least one codeword sequence corresponding to the user terminal; and the receiver 2002 is specifically configured to receive the uplink reference signal sent by the user terminal in the time unit of the uplink reference signal symbol group corresponding to the user terminal by using the at least one codeword sequence corresponding to the user terminal.

Optionally, the time unit is a time unit corresponding to an SC-FDMA symbol, or a time unit corresponding to an OFDMA symbol.

The base station provided by Embodiment 8 of the present invention can perform the uplink reference signal transmission method in Embodiment 3. For a beneficial effect and an implementation process of the base station, refer to the descriptions in the foregoing embodiment. Details are not further described herein.

Figure 21:
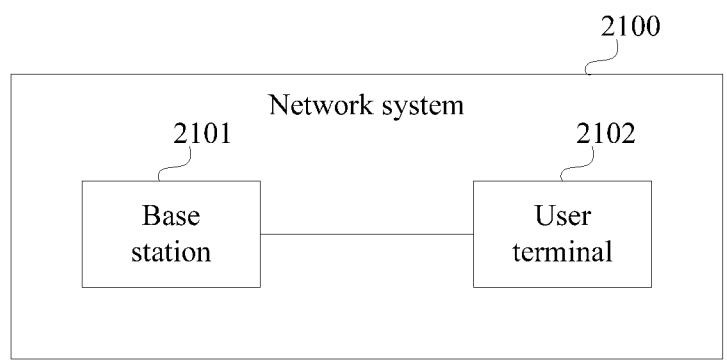
FIG. 21 is a schematic structural diagram of a network system according to Embodiment 9 of the present invention.

Embodiment 9 of the present invention further provides a network system. FIG. 21 is a schematic structural diagram of the network system according to Embodiment 9 of the present invention. As shown in FIG. 21, the network system 2100 may include at least one base station 2101 and at least one user terminal 2102 in a cell of each of the at least one base station.

Each of the at least one base station 2101 may be the base station in Embodiment 6 or Embodiment 8, and can perform the uplink reference signal transmission method provided by Embodiment 3. For a specific structure of each base station, refer to the base station in Embodiment 6 or Embodiment 8. Details are not further described herein. Each of the at least one user terminal 2102 may be the user terminal in Embodiment 5 or Embodiment 7, and can perform the uplink reference signal transmission method in Embodiment 1 or Embodiment 2. For a specific structure of each user terminal, refer to the user terminal in Embodiment 5 or Embodiment 7. Details are not further described herein. Each of the at least one base station 2101 and the at least one user terminal 2102 in the cell of each base station can jointly perform the uplink reference signal transmission method in Embodiment 4. If the network system 2100 includes at least two base stations 2101, a message may be transmitted between every two base stations in the at least two base stations 2101 by using an X2 interface.

In the network system provided by Embodiment 9 of the present invention, the base station and the user terminal can perform the uplink reference signal transmission method provided by the foregoing embodiment. A beneficial effect of the network system is similar to that of the foregoing embodiment. Details are not further described herein.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. An uplink reference signal transmission method, comprising:

determining, by a user terminal, an uplink reference signal position according to first higher layer signaling, wherein the uplink reference signal position comprises at least one uplink reference signal symbol group comprising a plurality of time units that are reserved for transmitting an uplink reference signal by a user terminal;

determining, by the user terminal, in the uplink reference signal position according to second higher layer signaling or received first control information of a physical channel, an uplink reference signal symbol group corresponding to the user terminal, wherein the second higher layer signaling or the first control information comprises indication information of the uplink reference signal symbol group corresponding to the user terminal; and sending, by the user terminal, an uplink reference signal in a time unit of the uplink reference signal symbol group corresponding to the user terminal;

wherein at least a first uplink reference signal symbol group of the at least one uplink reference signal symbol group comprises a plurality of time units that are separated in time with each time unit of the plurality of time units of the at least the first uplink reference signal symbol group separated from an immediately next time unit of the plurality of time units by at least one other time unit.

2. The method according to claim 1, wherein the uplink reference signal position further comprises at least one uplink reference signal subcarrier group, and each uplink reference signal subcarrier group comprises at least 12 uplink subcarriers;

before the sending, by the user terminal, an uplink reference signal in a time unit of the uplink reference signal symbol group corresponding to the user terminal, the method further comprises:

determining, by the user terminal, in the uplink reference signal position according to the second higher layer signaling or the first control information, the uplink reference signal symbol group corresponding to the user terminal and an uplink reference signal subcarrier group corresponding to the user terminal, wherein the second higher layer signaling or the first control information further comprises indication information of the uplink reference signal subcarrier group corresponding to the user terminal; and the sending, by the user terminal, an uplink reference signal in a time unit of the uplink reference signal symbol group corresponding to the user terminal comprises:

sending, by the user terminal, the uplink reference signal in the time unit of the uplink reference signal symbol group corresponding to the user terminal in a time domain and a subcarrier of the uplink reference signal subcarrier group corresponding to the user terminal in a frequency domain.

3. The method according to claim 2, wherein a frequency spacing of at least one subcarrier exists between every two subcarriers in the at least 12 uplink subcarriers.

4. The method according to claim 1, wherein the determining, by a user terminal, an uplink reference signal position according to first higher layer signaling comprises:

determining, by the user terminal, uplink reference signal position information according to the first higher layer signaling, wherein the uplink reference signal position information comprises frequency domain position information; and determining, by the user terminal, the uplink reference signal position in a preset timeslot or subframe according to the frequency domain position information.

5. The method according to claim 1, wherein the determining, by a user terminal, an uplink reference signal position according to first higher layer signaling comprises:

determining, by the user terminal, uplink reference signal position information according to the first higher layer signaling, wherein the uplink reference signal position information comprises time domain position information and frequency domain position information; and determining, by the user terminal, the uplink reference signal position according to the frequency domain position information and the time domain position information.

6. The method according to claim 1, wherein before the sending, by the user terminal, an uplink reference signal in a time unit of the uplink reference signal symbol group corresponding to the user terminal, the method further comprises:

determining, by the user terminal according to third higher layer signaling or received second control information of the physical channel, at least one codeword sequence corresponding to the user terminal, wherein the third higher layer signaling or the second control information comprises indication information of the codeword sequence corresponding to the user terminal; and correspondingly, the sending, by the user terminal, an uplink reference signal in a time unit of the uplink reference signal symbol group corresponding to the user terminal comprises:

sending, by the user terminal, the uplink reference signal in the time unit of the uplink reference signal symbol group corresponding to the user terminal by using the at least one codeword sequence corresponding to the user terminal.

7. An uplink reference signal transmission method, comprising:

sending, by a base station, first higher layer signaling to a user terminal, wherein the first higher layer signaling is used by the user terminal to determine an uplink reference signal position, the uplink reference signal position comprises at least one uplink reference signal symbol group comprising a plurality of time units that are reserved for transmitting an uplink reference signal by a user terminal;

sending, by the base station, second higher layer signaling to the user terminal, or sending first control information to the user terminal by using a physical channel, wherein the second higher layer signaling or the first control information comprises indication information of an uplink reference signal symbol group corresponding to the user terminal, and the indication information of the uplink reference signal symbol group corresponding to the user terminal is used to instruct the user terminal to determine, in the uplink reference signal position, the uplink reference signal symbol group corresponding to the user terminal; and receiving, by the base station, an uplink reference signal sent by the user terminal in a time unit of the uplink reference signal symbol group corresponding to the user terminal;

wherein at least a first uplink reference signal symbol group of the at least one uplink reference signal symbol group comprises a plurality of time units that are separated in time with each time unit of the plurality of time units of the at least the first uplink reference signal symbol group separated from an immediately next time unit of the plurality of time units by at least one other time unit.

8. The method according to claim 7, wherein the uplink reference signal position comprises at least one uplink reference signal subcarrier group, and each uplink reference signal subcarrier group comprises at least 12 uplink subcarriers;

the second higher layer signaling or the first control information further comprises indication information of an uplink reference signal subcarrier group corresponding to the user terminal, and the indication information of the uplink reference signal subcarrier group corresponding to the user terminal is used to instruct the user terminal to determine, in the uplink reference signal position, the uplink reference signal subcarrier group corresponding to the user terminal; and the receiving, by the base station, an uplink reference signal sent by the user terminal in a time unit of the uplink reference signal symbol group corresponding to the user terminal comprises:

receiving, by the base station, the uplink reference signal sent by the user terminal in the time unit of the uplink reference signal symbol group corresponding to the user terminal in a time domain and a subcarrier of the uplink reference signal subcarrier group corresponding to the user terminal in a frequency domain.

9. The method according to claim 8, wherein a frequency spacing of at least one subcarrier exists between every two subcarriers in the at least 12 subcarriers.

10. The method according to claim 7, wherein the first higher layer signaling comprises uplink reference signal position information, wherein the uplink reference signal position information comprises frequency domain position information; and the frequency domain position information is used by the user terminal to determine the uplink reference signal position in a preset timeslot or subframe.

11. The method according to claim 10, wherein the method further comprises:

sending, by the base station, the uplink reference signal position information to another base station by using an X2 interface, wherein the uplink reference signal position information is used to make an uplink reference signal position of the another base station different from the uplink reference signal position of the base station.

12. The method according to claim 7, wherein the first higher layer signaling comprises uplink reference signal position information, wherein the uplink reference signal position information comprises time domain position information and frequency domain position information; and the time domain position information and the frequency domain position information are used by the user terminal to determine the uplink reference signal position.

13. The method according to claim 7, wherein before the receiving, by the base station, an uplink reference signal sent by the user terminal in a time unit of the uplink reference signal symbol group corresponding to the user terminal, the method further comprises:

sending, by the base station, third higher layer signaling to the user terminal, or sending second control information to the user terminal by using the physical channel, wherein the third higher layer signaling or the second control information comprises indication information of a codeword sequence corresponding to the user terminal, and the indication information of the codeword sequence corresponding to the user terminal is used to instruct the user terminal to determine at least one codeword sequence corresponding to the user terminal; and the receiving, by the base station, an uplink reference signal sent by the user terminal in a time unit of the uplink reference signal symbol group corresponding to the user terminal comprises:

receiving, by the base station, the uplink reference signal sent by the user terminal in the time unit of the uplink reference signal symbol group corresponding to the user terminal by using the at least one codeword sequence corresponding to the user terminal.

14. A communication device, comprising:
a processor, coupled to a non-transitory memory, wherein the memory stores an instruction; and when the processor executes the instruction to enable the device to perform:

determining an uplink reference signal position according to first higher layer signaling, wherein the uplink reference signal position comprises at least one uplink reference signal symbol group comprising a plurality of time units that are reserved for transmitting an uplink reference signal by a user terminal;

determining in the uplink reference signal position according to second higher layer signaling or received first control information of a physical channel, an uplink reference signal symbol group corresponding to a user terminal, wherein the second higher layer signaling or the first control information comprises indication information of the uplink reference signal symbol group corresponding to the user terminal; and sending an uplink reference signal in a time unit of the uplink reference signal symbol group corresponding to the user terminal;

wherein at least a first uplink reference signal symbol group of the at least one uplink reference signal symbol group comprises a plurality of time units that are separated in time with each time unit of the plurality of time units of the at least the first uplink reference signal symbol group separated from an immediately next time unit of the plurality of time units by at least one other time unit.

15. The device according to claim 14, wherein the uplink reference signal position further comprises at least one uplink reference signal subcarrier group, and each uplink reference signal subcarrier group comprises at least 12 uplink subcarriers;

before the sending an uplink reference signal in a time unit of the uplink reference signal symbol group corresponding to the user terminal, the instruction further comprises:

determining in the uplink reference signal position according to the second higher layer signaling or the first control information, the uplink reference signal symbol group corresponding to the user terminal and an uplink reference signal subcarrier group corresponding to the user terminal, wherein the second higher layer signaling or the first control information further comprises indication information of the uplink reference signal subcarrier group corresponding to the user terminal; and the sending an uplink reference signal in a time unit of the uplink reference signal symbol group corresponding to the user terminal comprises:

sending the uplink reference signal in the time unit of the uplink reference signal symbol group corresponding to the user terminal in a time domain and a subcarrier of the uplink reference signal subcarrier group corresponding to the user terminal in a frequency domain.

16. The device according to claim 15, wherein a frequency spacing of at least one subcarrier exists between every two subcarriers in the at least 12 uplink subcarriers.

17. The device according to claim 14, wherein the determining an uplink reference signal position according to first higher layer signaling comprises:

determining uplink reference signal position information according to the first higher layer signaling, wherein the uplink reference signal position information comprises frequency domain position information; and determining the uplink reference signal position in a preset timeslot or subframe according to the frequency domain position information.

18. The device according to claim 14, wherein the determining an uplink reference signal position according to first higher layer signaling comprises:
    determining uplink reference signal position information according to the first higher layer signaling, wherein the uplink reference signal position information comprises time domain position information and frequency domain position information; and
    determining the uplink reference signal position according to the frequency domain position information and the time domain position information.

* * * * *